United States Patent [19]
Fujita et al.

[11] 4,300,137
[45] Nov. 10, 1981

[54] MATRIX DRIVING METHOD FOR ELECTRO-OPTICAL DISPLAY DEVICE

[75] Inventors: Hiroo Fujita, Sayama; Akira Tsuzuki, Tokyo; Shigeru Morokawa, Higashiyamato, all of Japan

[73] Assignee: Citizen Watch Company Limited, Tokyo, Japan

[21] Appl. No.: 57,461

[22] Filed: Jul. 13, 1979

Related U.S. Application Data

[63] Continuation-in-part of Ser. No. 784,746, Apr. 5, 1977, abandoned.

[30] Foreign Application Priority Data

Apr. 6, 1976 [JP] Japan ................ 51/38536

[51] Int. Cl.$^3$ .......................... G08B 5/36
[52] U.S. Cl. .................. 340/765; 340/784; 350/332
[58] Field of Search .......... 340/765, 784; 350/332

[56] References Cited

U.S. PATENT DOCUMENTS

| | | | |
|---|---|---|---|
| 3,781,863 | 12/1973 | Fujita ............................ | 340/765 |
| 3,922,667 | 11/1975 | Ueda et al. .................... | 340/805 |
| 4,019,178 | 4/1977 | Hashimoto et al. ............ | 340/765 |
| 4,038,564 | 7/1977 | Hakata ........................... | 340/803 X |
| 4,041,481 | 8/1977 | Sato ............................... | 340/787 |
| 4,044,346 | 8/1977 | Akahane et al. ............... | 340/765 |
| 4,050,064 | 9/1977 | Hashimoto et al. ............ | 340/784 X |
| 4,078,374 | 3/1978 | Kondo ............................ | 350/332 X |
| 4,091,377 | 5/1978 | Shimoi ........................... | 350/332 X |
| 4,110,967 | 9/1978 | Fujita ............................. | 350/332 X |
| 4,142,182 | 2/1979 | Kmetz ............................ | 340/765 |
| 4,186,395 | 1/1980 | Fujita et al. ................... | 340/765 |

*Primary Examiner*—David L. Trafton
*Attorney, Agent, or Firm*—Jordan and Hamburg

[57] ABSTRACT

A matrix driving method for driving an electro-optical display device including digit and segment electrodes arranged in a matrix configuration, in which digit and segment drive signals are applied to digit and segment electrodes in such a manner that the digit drive signals applied to all the digit electrodes have potentials equal in level with each other during a prescribed time interval during which the potential of a first segment drive signal inducing a state of non-display at all the digit electrodes is equal to the potential of each of the digit drive signals. During the prescribed time intervals, the potential difference between a second segment drive signal inducing a state of display at one of the digit electrodes and a state of non-display at the other digit electrode and each of the digit drive signals is maintained in a first predetermined value whereby the root mean square value of the potential difference between the second segment drive signal and the digit drive signal applied to the other digit electrode is substantially equal to that of the potential difference between the first segment drive signal and each of the digit drive signals. During the prescribed time interval, further, the potential difference between a third segment drive signal inducing a state of display at all the digit electrodes and each of the digit drive signals is maintained in a second predetermined value whereby the root mean square value of the potential difference between the second segment drive signal and the digit drive signal applied to the one of the digit electrodes is substantially equal to that of the potential difference between the third segment drive signal and each of the digit drive signals.

4 Claims, 34 Drawing Figures

Fig. 10
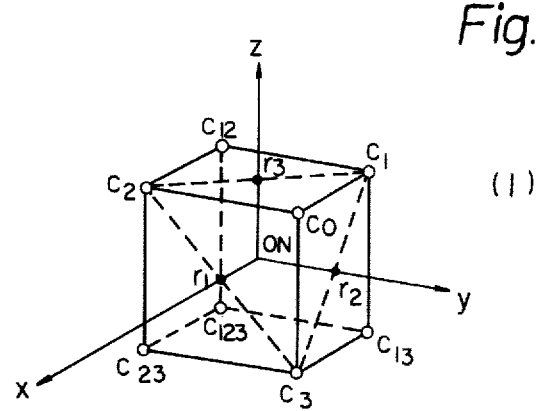
(1)
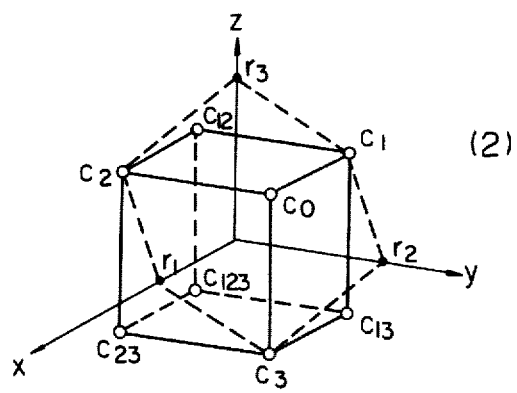
(2)
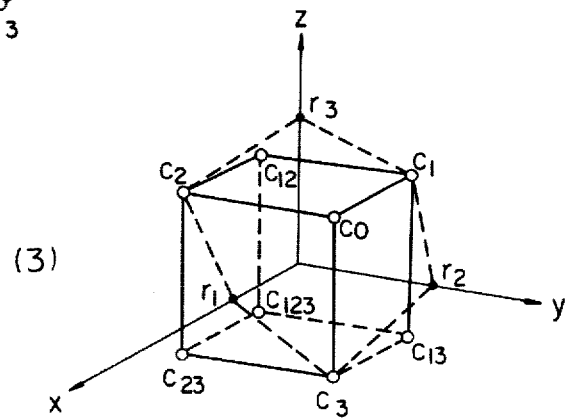
(3)

Fig. 15
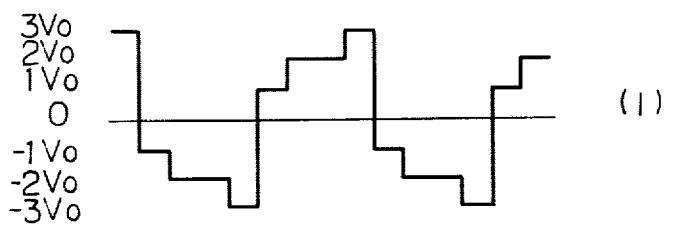
(1)
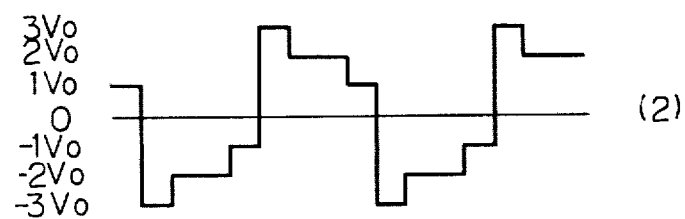
(2)
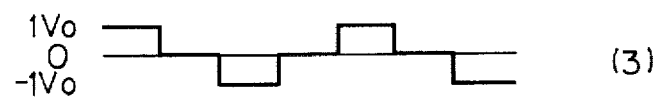
(3)
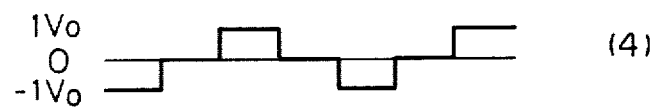
(4)
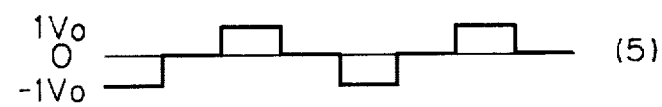
(5)
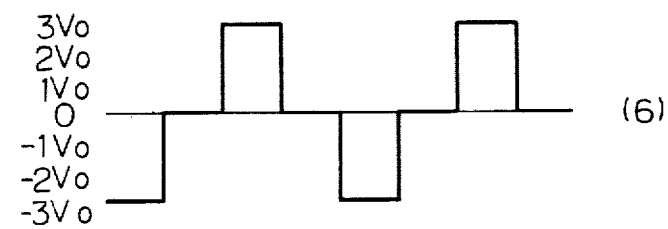
(6)

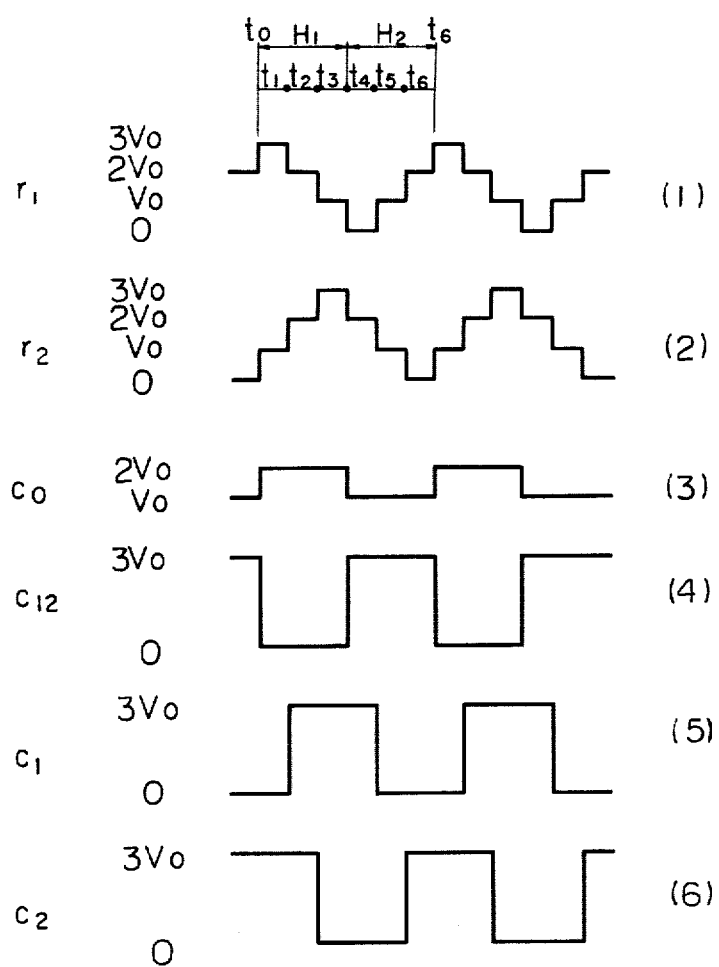

MATRIX DRIVING METHOD FOR ELECTRO-OPTICAL DISPLAY DEVICE

This application is a continuation in part of patent application Ser. No. 784,746, filed Apr. 5, 1977, now abandoned.

This invention relates to a method for driving an electro-optical display device such as a liquid crystal display device and, more particularly, to a method for driving an electro-optical display device having digit and segment electrodes arranged in a matrix configuration.

In recent years, electro-optical display devices such as liquid crystal display devices have been increasingly used in various applications such as electronic timepieces, desk calculators, etc., because of low power consumption. It is known in the art that there are two types of arrangements for the electrodes of the liquid crystal display devices, i.e., a static type arrangement and a matrix type arrangement. In the static type arrangement, the liquid crystal display device comprises a common electrode and a plurality of groups of segment electrodes displaced from and disposed opposite the common electrode. The segment electrodes of each group are not interconnected and independently driven from each other. This arrangement is advantageous in that a driver circuit for each segment electrode can be manufactured in a simple construction. However, this has drawbacks in that a number of driver circuits are required and increases the number of leads from the liquid crystal display device, increasing packaging cost and complexity.

In the matrix type arrangement, the liquid crystal display device comprises a plurality of digit electrodes, and a plurality of segment electrodes displaced from and disposed opposite all of the digit electrodes. The segment electrodes relative to each digit electrode are interconnected, and the digit electrodes are provided independently from each other. Generally, the digit electrodes are driven in a time multiplexed relationship. With this arrangement, the number of leads from the liquid crystal display device is remarkably reduced, representing a considerable saving in packaging cost and complexity. However, this suffers from drawbacks in the design of driver circuits because of low display contrast.

It is, therefore, an object of the present invention to provide a method for driving an electro-optical display device in a matrix mode which can overcome the shortcomings encountered in the prior art.

It is another object of the present invention to provide a driving method for driving an electro-optical display device in a matrix mode so as to provide a remarkably increased operation margin to increase display contrast.

These and other, objects, features and advantages of the present invention will become more apparent from the following description when taken in conjunction with the accompanying drawings, in which:

FIG. 10 shows vector diagrams for the drive signals shown in FIG. 9;

FIG. 15 shows the potential difference across the electrodes applied with the drive signals shown in FIG. 14;

FIG. 16 is a timing chart for another preferred example of digit and segment drive signals according to the present invention;

Figure 1A:
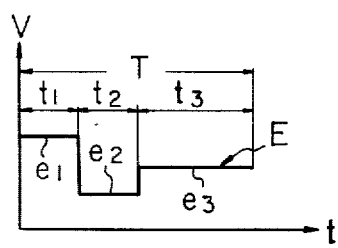
FIG. 1A is an example of a timing chart for an example of a conventional drive signal to be used for driving an electro-optical display device.

Before entering to a detailed description of the present invention, an explanation will be given to how to convert a potential of a driving signal to vector quantities with reference to FIGS. 1A and 1B. A signal cycle or half cycle T of the driving signal waveform is divided into a number of intervals $t_1, t_2, \ldots t_j$. $t_i$ is assumed as the width (duration) of the i-th interval, and the potential of the driving signal over each such interval is assumed to be constant and is assigned as $e_i$. The j-dimension vector $e$ having the i-th component which specified $e_i \sqrt{t_i/T}$ will be herein defined as a vector corresponding to the driving waveform E (FIG. 1) and expressed in the following equation:

$$e = \begin{pmatrix} e_1 \sqrt{t_1/T} \\ e_2 \sqrt{t_2/T} \\ e_j \sqrt{t_j/T} \end{pmatrix} \quad (1)$$

Figure 1B:
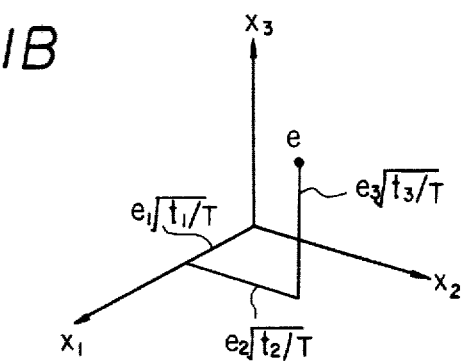
FIG. 1B is a vector diagram of the drive signal shown in FIG. 1A.

FIG. 1B shows the vector diagram indicating the components of the vector e. FIGS. 1A and 1B shows examples of the waveforms of the driving signal and the vector diagram in which $j=3$.

The root mean square value $V_{kl}$ of the potential representative of the difference between two signals $A_k$ and $A_l$ becomes:

$$V_{kl} = \sqrt{\frac{1}{T} \int_0^T (A_k - A_l)^2 \cdot dt} = \sqrt{\frac{1}{T} \sum_{i=1}^{j} (a_{ki} - a_{li})^2 \cdot t_i}$$

This is equivalent to the distance between $a_k$ and $a_l$ in the j-dimension space, namely $$\overline{a_k a_l} = \sqrt{\sum_{i=1}^{j} (a_{ki}\sqrt{t_i/T} - a_{li}\sqrt{t_i/T})^2}$$

The signal waveforms $A_1, A_2, \ldots A_n$ may be brought into correspondence with another set of vectors $a_1', a_2', \ldots a_n'$ by an interval dividing method which is different from that given above. These vectors may be different from $a_1, a_2, \ldots a_n$ even in dimension number, but $a_1, a_2, \ldots a_n$ and $a_1', a_2', \ldots a_n'$ are congruent. In other words, it is possible to bring them into coincidence by rotational movement, parallel movement and a reversal transformation.

The transformation from vectors $a_1, a_2, \ldots a_n$ to signal waveforms will be carried out by a procedure which is the reverse of that stated above. However, this transformation is not a one-to-one correspondence because in this case $t_1, t_2, \ldots t_n$ can be arbitrarily selected according to formula (1).

However, when the method of selecting $t_1, t_2, \ldots t_n$ is changed and a transformation made to other signals $A_1', A_2',$ the root mean square values of the potential differences between signals, that is signals $A_1, A_2, \ldots A_n$ and signals $A_1', A_2', \ldots A_n'$, maintain the same relation. The root mean square value of the potential differences also maintain the same relation for $A_1'', A_2'', \ldots A_n''$ in which a transformation is made to signal waveforms from vectors $a_1', a_2', \ldots a_n'$, obtained by the rotational movement, parallel movement and reverse transformation of vectors $a_1, a_2, \ldots a_n$. Accordingly, it can be understood that signal waveform groups $A_1, A_2, \ldots A_n$; $A_1', A_2', \ldots A_n'$; and $A_1'', A_2'', \ldots A_n''$ constitute components of one set A. Likewise, $a_1, a_2, \ldots a_n$ and $a_1', a_2' \ldots a_n'$ constitute components of one set a over the vector space, with which set A may be considered to be in one-to-one correspondence.

Considering the transformation from vector to waveform in a practical light, it is preferable that the waveform be as simple as possible; in particular, the simplicity of the signal waveform has a great effect upon the number of gates in the driving circuit. It follows that there are cases in which prior to transforming the vectors it is better to perform a suitable transformation of coordinates to change the vector dimension number before making the transformation to the waveforms.

A convenient method of dealing with the transformation of vector coordinates is to apply a matrix as shown below. For a transformation from j-dimension vectors $a_1, \ldots a_n$ to l-dimension vectors $a'_1, \ldots a'_n$, we have $$a_1 = \begin{pmatrix} X_1 \\ Y_1 \\ Z_1 \end{pmatrix} \quad a_2 = \begin{pmatrix} X_2 \\ Y_2 \\ Z_2 \end{pmatrix} \cdots a_n = \begin{pmatrix} X_n \\ Y_n \\ Z_n \end{pmatrix}$$

$$\vdots$$

$$a_1' = \begin{pmatrix} X_1' \\ Y_1' \\ Z_1' \end{pmatrix} \quad a_2' = \begin{pmatrix} X_2' \\ Y_2' \\ Z_2' \end{pmatrix} \cdots a_n' = \begin{pmatrix} X_n' \\ Y_n' \\ Z_n' \end{pmatrix}$$

$$\vdots$$

Vectors $a_n, a'_n$ are thus represented respectively by matrix with j rows and l rows, and $(a'_1, a'_2 \ldots a'_n)$ with l rows and n columns are represented by the following matrix:

$$\begin{pmatrix} X_1', X_2' \ldots X_n' \\ Y_1', Y_2' \ldots Y_n' \\ Z_1', Z_2' \ldots Z_n' \\ \vdots \end{pmatrix}$$

Figure 2:
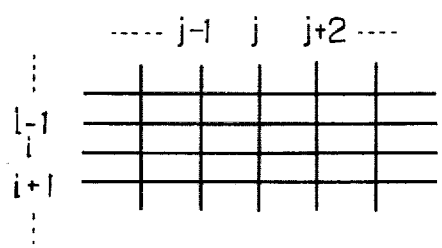
FIG. 2 is a schematic view of an example of a conventional electro-optical display device arranged in a matrix configuration.

Assume that K represents a matrix with l rows and n columns. To represent a unit matrix I with l rows and l columns, use is made of a matrix N with l rows and n columns where $N^T \cdot N = I$ so that $(a_1', a_2', \ldots a_n') = N \cdot (a_1, a_2, \ldots a_n) + K$ Referring now to FIG. 2, there is shown a model matrix layout in which the i order represents a group of digit electrodes while the j order denotes a group of segment electrodes. Discussion will now be directed toward the relationships between digit driving signals and address signals applied to the j segment electrodes.

Figure 3:
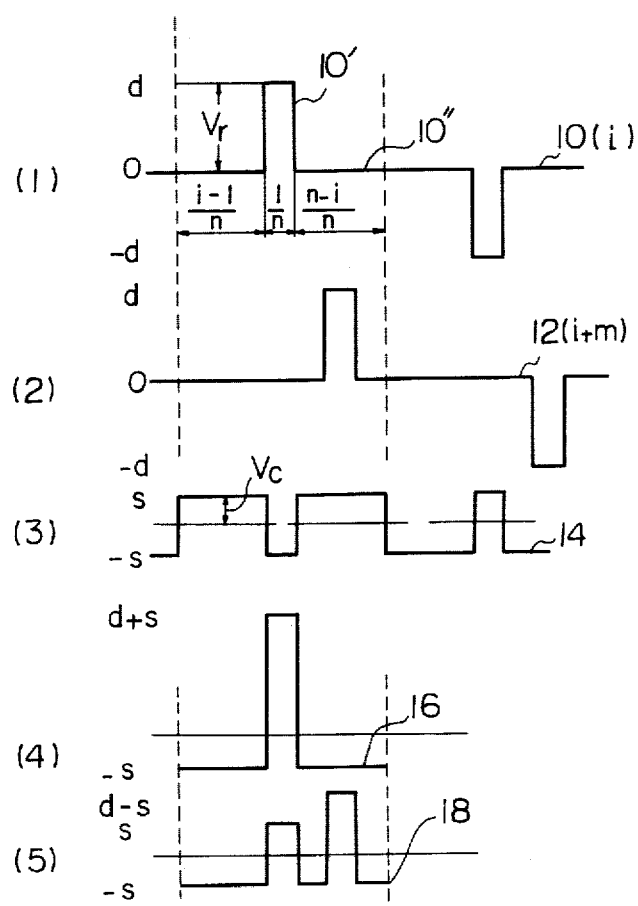
FIG. 3 is a timing chart for illustrating another example of conventional digit and segment drive signals to be used for driving the display device shown in FIG. 2.

FIG. 3 shows typical voltage waveforms which are applied in the prior art to the digit and segment electrodes. Discussion will be made with respect to one-half the driving period. In FIG. 3, $\pm d$ will be taken as the voltage impressed upon the digit electrodes while $\pm s$ represents the voltage impressed upon the segment electrodes. In FIG. 3, reference numeral 10 denotes the waveform of the voltage applied to the i-th digit electrode and reference numeral 12 the waveform of the voltage applied to the (i+m)-th digit electrode. Reference numeral 14 denotes the waveform of the voltage impressed upon segment electrode j.

Hereinafter the matrix driving system will be described, using an integer n representing a n digits (n≦2). In general, the timing relationship between waveforms 10 and 12 will be assumed as follows: the portion denoted by reference numeral 10' will be represented by 1/n and the portion 10" by (n-i)/n. In other words, n represents the number of the digit electrodes and 1/n the duty.

FIGS. 3(4) and 3(5) represent the voltage difference between the electrodes. Here, reference numeral 16 denotes the voltage waveform for an intersection i.j, and 18 the voltage waveform for an intersection (i+m).j. To obtain the root mean square (rms) voltage of the waveform shown in FIG. 3(4), the following equation is employed:

$$V_{rms} = \sqrt{\frac{n-1}{n} s^2 + \frac{1}{n}(s+d)^2}$$

while the equation for the rms voltage of the waveform in FIG. 3(5) is given by $$V_{rms} = \sqrt{\frac{n-1}{n} s^2 + \frac{1}{n}(d-s)^2}$$

where (4) denotes a display state and (5) a non-display state. Letting s=1, the operation margin $\alpha$ can be obtained from $$\alpha = \sqrt{\frac{(n-1)+(d+1)^2}{(n-1)+(d-1)^2}} \quad (2)$$

The operation margin is thus the value which represents the minimum ratio of the rms voltage during a period in which there is a display to the rms voltage during a period in which there is no display; accordingly, the values of n and d determine the operation margin. It follows then that when driving a 2-digit matrix with n=2, $\alpha = \sqrt{5}$ for d=1 and for d=2. When d=1, this corresponds to so-called ½ biasing whereas ⅓ biasing corresponds to a case where d=2. From the above equation (2) it will be seen that when d=√n, the operation margin $\alpha$ becomes the maximum value, i.e., $$\alpha = \frac{\sqrt{n+1}}{\sqrt{n-1}}.$$

It is apparent from the above description that in a conventional system the maximum operation margin is ($\sqrt{2}+1$) for matrix driving with n=2. Such systems are premised on the fact that there is no overlapping of phases or potential levels with regard to the signals which drive the respective digits.

Figure 4:
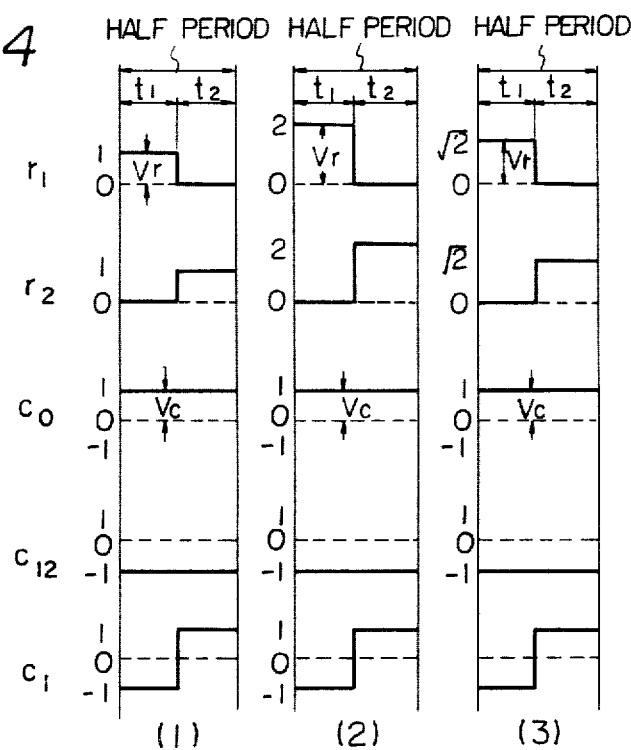
FIG. 4 is a timing chart of another example of conventional digit and segment drive signals.
Figure 5:
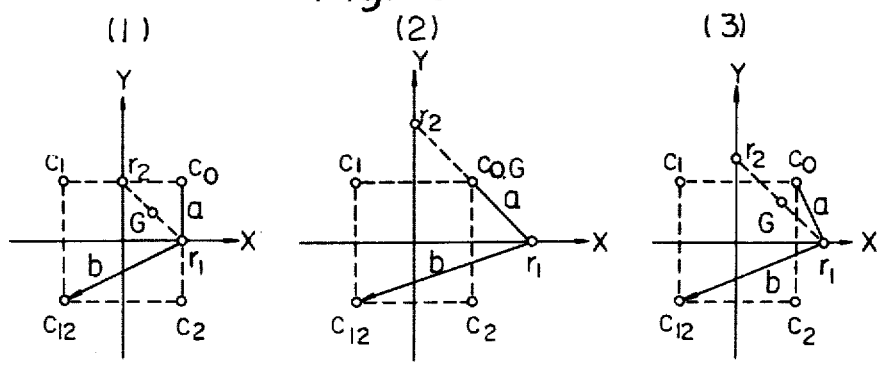
FIG. 5 shows vector diagrams for the drive signals shown in FIG. 4.

FIG. 4 shows the waveform diagrams for the driving signals to be applied to digit and segment electrodes in various prior art driving methods in which n=2, and FIG. 5 shows vector diagrams for the signals shown in FIG. 4. In FIG. 4, $r_1$ represents the waveform impressed upon a first digit electrode, and $r_2$ the waveform impressed upon a second digit electrode. Similarly, $c_0$ represents the waveform impressed upon a segment electrode to induce a non-display state at intersections between the segment electrode and both the first and second digit electrodes. $C_{12}$ represents the waveform by which the segments at both the corresponding intersections are in a state of display. Similarly, $C_1$ is the waveform by which the segment at an intersection with the first digit electrode and the second digit electrode is in state of non-display. FIG. 4(1) represents a group of waveforms for the driving signals in the ½ biasing method in which $V_r = V_c$. FIG. 4(2) represent the waveform for the driving signals in the ⅓ biasing method in which $V_r = 2 V_c$. Similarly, FIG. 4(3) represents the waveforms for the driving signals in which $V_r = \sqrt{2} \cdot V_c$.

In FIG. 5(1), a convenient set of X and Y axes is chosen and $r_1$ and $r_2$ indicative of varying potentials of corresponding digit drive signals $r_1'$ and $r_2'$ are resolved as vectors into X and Y components along these axes. In FIG. 5(1), the symbols $C_0$, $C_1$ and $C_{12}$ represent varying potentials of the corresponding segment drive signals $C_0$, $C_1$ and $C_{12}$. The symbol G represents the mean value in potential of the digit drive signals at each time instant. The time interval $t_1$ is resolved into the X axis, and the time interval $t_2$ is resolved into the Y axis. In FIG. 5(1), $r_1$ has a potential value of 1 during the time interval $t_1$, and $r_2$ has a potential value of 0 during the time interval $t_2$. Similarly, $r_2$ has a value of 0 during the time interval $t_1$ and has a value of 1 during the time interval $t_2$. Resolving $c_0$ at co-ordinates (1, 1), $c_1$ at co-ordinates (−1, 1), $c_2$ at co-ordinates (1, −1) and $c_{12}$ at co-ordinates (−1, −1) produces a square with the length of each side having a potential value of 2. G is plotted at co-ordinates (½, ½). Vector a represents the rms voltage $V_{off}$ indicative of the state of non-display, and vector b represents the rms voltage $V_{on}$ indicative of the state of display. Since the operation margin $\alpha$ is expressed by the ratio of $V_{on}$ to $V_{off}$, the following equation holds:

$$\alpha = |b|/|a| = \sqrt{5}/1 = \sqrt{5}$$

In a case shown in FIG. 5(2), G is plotted at the same point as $C_0$, and $|a| = \sqrt{2}$ and $|b| = \sqrt{10}$. Therefore, the operation margin $\alpha$ is $\sqrt{5}$. Similarly, in a case of FIG. 5(3) G is plotted at a point ($\sqrt{2}/2$, $\sqrt{2}/2$). In this example, since $|a| = 2(2-\sqrt{2})$ and $|b| = 2(2+\sqrt{2})$, the operation margin $\alpha$ is $1+\sqrt{2}$.

The relationship in the three cases among $r_1$, $r_2$, $c_0$, $c_1$, $c_2$ and $c_{12}$ with respect to the half period is expressed by the following matrixes:

$$(r_1, r_2, c_0, c_1, c_2, c_{12}) =$$

$$\begin{pmatrix} 1 & 0 & 1 & -1 & 1 & -1 \\ 0 & 1 & 1 & 1 & -1 & -1 \end{pmatrix}$$

$$\begin{pmatrix} 2 & 0 & 1 & -1 & 1 & -1 \\ 0 & 2 & 1 & 1 & -1 & -1 \end{pmatrix}$$

$$\begin{pmatrix} \sqrt{2} & 0 & 1 & -1 & 1 & -1 \\ 0 & \sqrt{2} & 1 & 1 & -1 & -1 \end{pmatrix}$$

Figure 6:
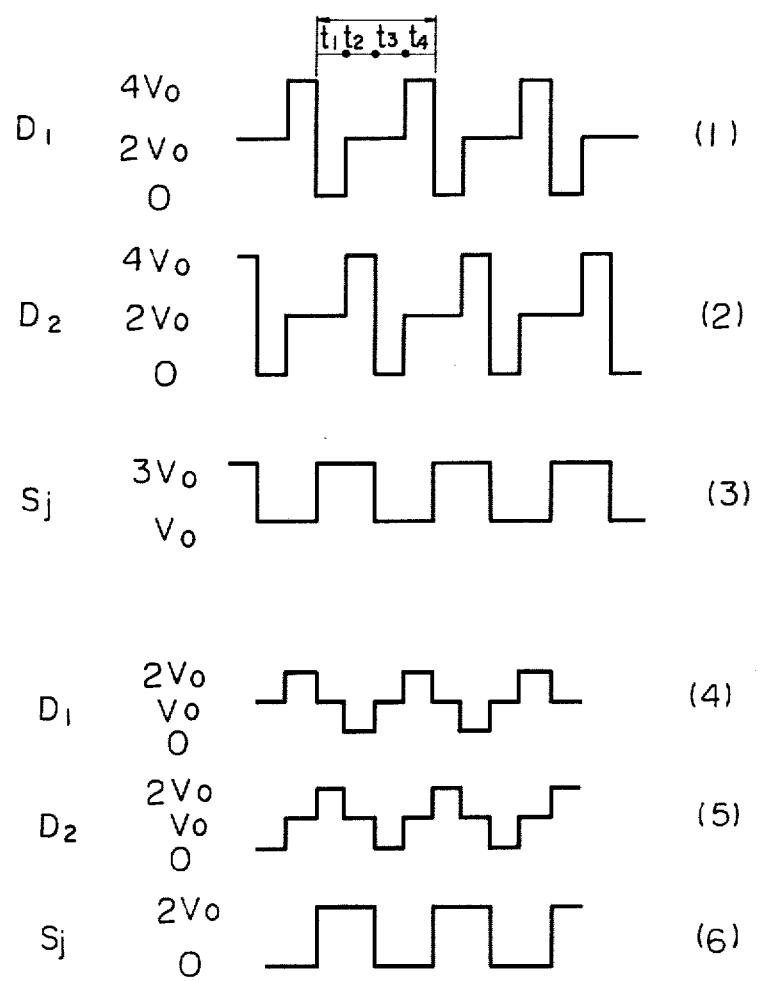
FIG. 6 is a timing chart for another example of conventional drive signals.

FIGS. 6 (1, 2, 3) shows the actual waveforms for the situation described with reference to FIG. 4(2), i.e., with $n=2$, $Vc=1$ and $Vr=2$. FIG. 6(1) shows the waveform impressed upon a digit electrode D1, and FIG. 6(2) shows the waveform impressed upon a digit electrode D2. Similarly, FIG. 6(3) shows the waveform impressed upon any segment electrode Sj to display only in the digit D1. As may be appreciated from the drawings, five potential levels, namely 0, Vo, 2 Vo, 3 Vo and 4 Vo are employed. By combining these waveforms a liquid crystal may be driven at an operational margin of $\sqrt{5}$.

FIGS. 6(4), (5) and (6) correspond as in FIG. 4(1) to a case in which $Vc=Vr=1$ and show the waveforms which are impressed upon a digit electrode D1, a digit electrode D2, and any segment electrode Sj to display only in the digit D1, respectively. As previously explained, the obtainable operation margin $\alpha$ is $\sqrt{5}$. Here, three potentials 0, Vo and 2 Vo are employed.

Figure 7:
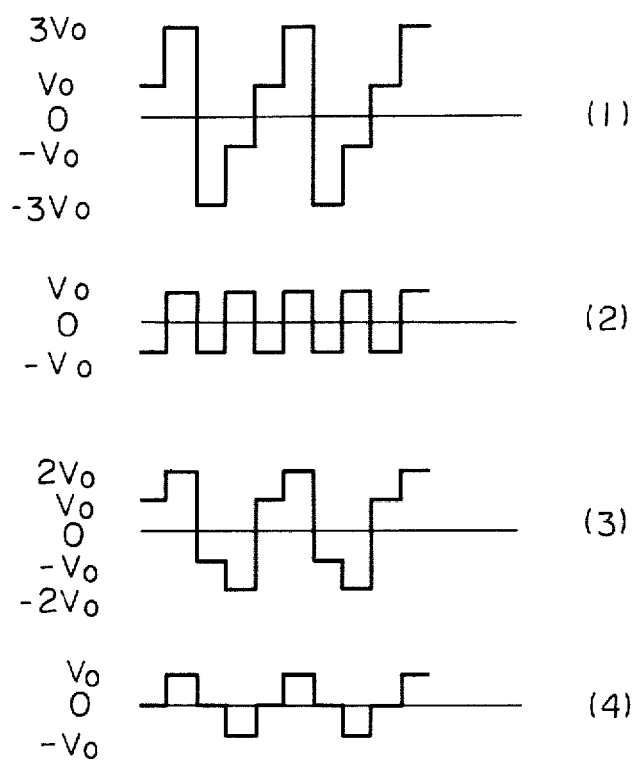
FIG. 7 is a timing chart for illustrating the potential differences across the electrodes of the display device.

FIG. 7 illustrates the waveforms which are obtained across the electrodes of a liquid crystal by making use of the waveforms shown in FIG. 6. FIG. 7(1) shows the waveforms for a display state when $Vr=2$, and FIG. 7(2) the waveforms for a non-display state when $Vr=2$. Similarly, FIGS. 7(3) and (4) depict the respective waveforms for display and non-display states when $Vr=1$.

Figure 8:
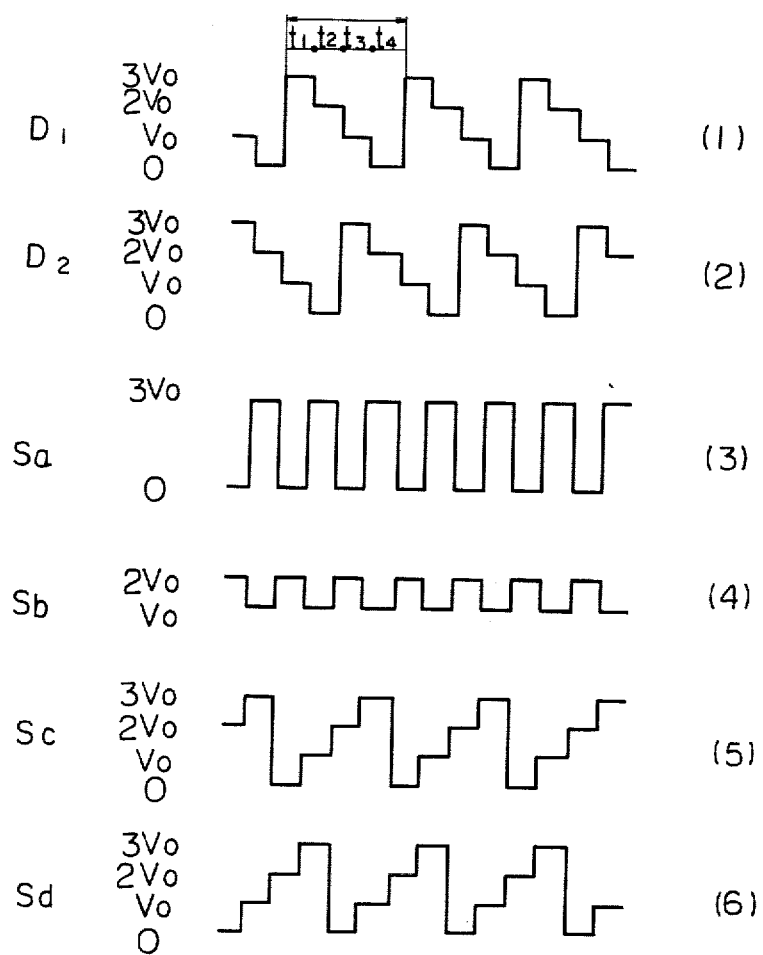
FIG. 8 is a timing chart for another example of prior art drive signals.

FIG. 8 depicts the waveforms for matrix driving in accordance with conventional systems when $n=2$ and four potentials, namely 0, Vo, 2 Vo and 3 Vo are employed. FIGS. 8(1) and (2) show the waveforms which are impressed upon a digit electrode D1 and a digit electrode D2, respectively. It can be understood from FIG. 8(1) that the driving signal for these digit electrodes consists of four equal intervals $t_1$, $t_2$, $t_3$ and $t_4$ which comprise one period (or cycle time). If the potentials for the D1 digit signal and D2 digit signal over each of these intervals are added, the sums are 4 Vo for $t_1$, 2 Vo for $t_2$, 4 Vo for $t_3$ and 2 Vo for $t_4$, thus repetitively alternating between 4 Vo and 2 Vo. In other words, either a potential of 0 or 3 Vo appears once during each unit time interval without overlapping each another and at no time do identical potential levels appear during any of the intervals $t_1$ through $t_4$.

FIGS. 8(3), (4), (5) and (6) show the waveforms of signals impressed upon any segment electrode Sj to induce the display or non-display state for a matrix where $n=2$. Signal Sa in FIG. 8(3) is a segment drive signal when intersections $D1S_j$ and $D2S_j$ are both in a display state. Similarly, signal Sb in FIG. 8(4) is the corresponding signal when $D1S_j$ and $D2S_j$ are both in a state of non-display, signal Sc in FIG. 8(5) is the corresponding signal when $D1S_j$ is in a display state and $D2S_j$ in a state of non-display, and signal Sd in FIG. 8(6) is the corresponding signal when $D1S_j$ is in a state of non-display and $D2S_j$ is in a display state. In this case the waveforms across the electrodes of the liquid crystal are as illustrated by FIG. 7(1) and (2), and the operation margin $\alpha$ is $\sqrt{5}$.

Figure 9:
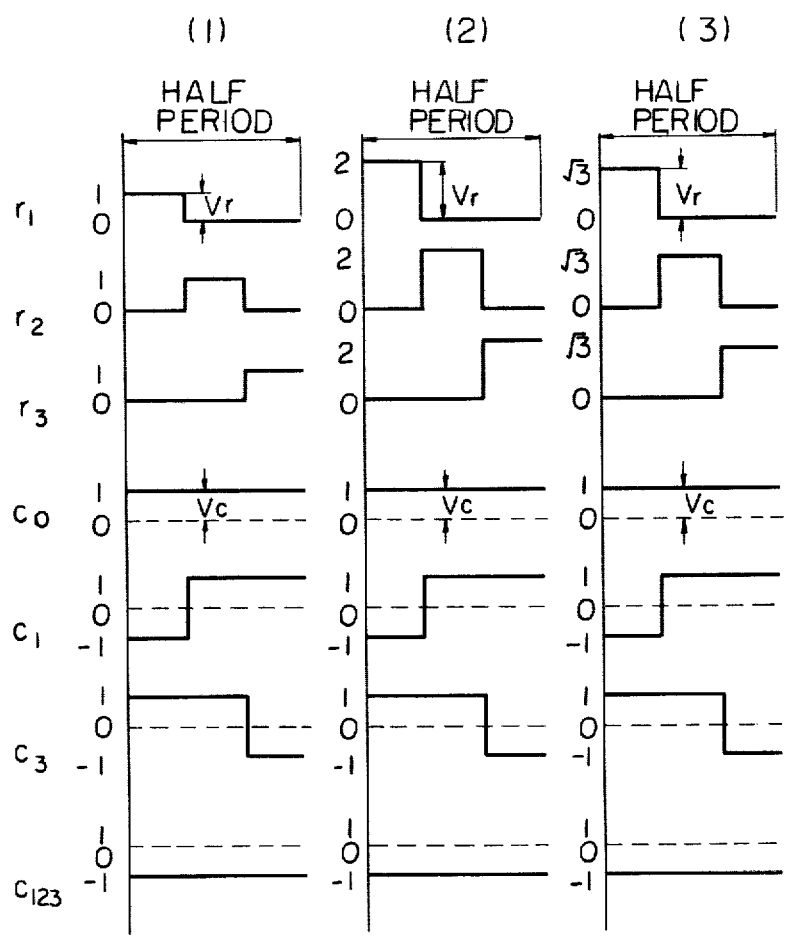
FIG. 9 is a timing chart for illustrating a prior art concept of the method of the present invention.

FIG. 9 shows the waveform diagrams of driving signals used in three-digit matrix driving method with $n=3$. In FIG. 9, $r_1$, $r_2$ and $r_3$ represent digit drive signals, and $c_0$, $c_1$, $c_3$, $c_{123}$ represent segment drive signals, respectively. In FIG. 9(1), the voltage potential $V_r$ of the digit drive signal is equal to the voltage potential $V_c$ of the segment drive signal $V_c$ and expressed as:

$$V_r = V_c$$

In this case, the rms voltage $V_{off}$ in the non-display state is $\sqrt{2}$ and rms voltage $V_{on}$ in the display state is $\sqrt{6}$. Therefore, the operation margin $\alpha$ is $\sqrt{3}$.

In FIG. 9(2), $V_r = 2 V_c$, and the rms voltage $V_{off}$ is 1 while the rms voltage $V_{on}$ is $\sqrt{11/3}$. Therefore, the operation margin $\alpha$ is $\sqrt{11/3}$.

In FIG. 9(3), $V_r = \sqrt{3} \cdot V_c$, and the rms voltage $V_{off}$ is $\sqrt{2(3-\sqrt{3})}$ while the rms voltage $V_{on}$ is $\sqrt{2(3+\sqrt{3})}$ so that the operation margin $\alpha$ is $$\frac{\sqrt{6} + \sqrt{2}}{2}.$$

FIGS. 10(1), (2) and (3) show the vector diagrams for the waveforms used in FIGS. 9(1), (2) and (3), respectively.

In FIG. 10, $r_1$, $r_2$ and $r_3$ indicative of varying potentials of the corresponding digit drive signals $r_1$, $r_2$ and $r_3$ in FIG. 9 are resolved as vectors into X, Y and Z axes, respectively. $c_1$, $c_2$, $c_3$, $c_{12}$, $c_{13}$ and $c_{23}$ correspond to voltage potentials of the segment drive signals producing display at one or two digits. From these vector diagrams, it will be possible to grasp the potential difference across the electrodes.

From the above description, it will be understood that the waveforms of the drive signals consist of a half-period (for example $t_1$, $t_2$ in FIGS. 6 and 8) and another half-period (for example $t_3$, $t_4$). Each half-period is sub-divided into n equal parts and each interval is assigned to a respective digit. Interval $t_1$ corresponds to a 1st digit, and interval $t_2$ to a 2nd digit; if the digit driving voltages are now represented with the mean value of all the digit driving signals taken as a reference, then a large driving voltage will be generated for the 1st digit driving signal over the interval $t_1$, the 2nd digit driving signal over the interval $t_2$, and the ith digit driving signal over the interval $t_i$, and the voltage will drop to a low level over the other intervals. In addition, the segment signal voltage during interval $t_1$ and the segment signal voltage during interval $t_i$ are both determined by the state of display or non-display of the 1st digit and ith digit, respectively, in accordance with the pattern that decides which digits should be displayed by the segment signal. It is preferable that the voltage for the segment signal during the non-display state be close to the mean voltage of all the digit driving signals; even so, the rms value of the driving voltage does not fall to 0 during a state of non-display. Moreover, if we consider the driving voltage at the ith intersection when the ith digit is to be displayed, then this voltage is exactly the same as the driving voltage at the ith intersection when the ith digit is not to be displayed during the half-period from which interval $t_i$ is omitted, and the rms value of the driving voltage differs only by the difference in voltage applied over the interval $t_i$.

In a matrix driving method of the present invention, the driving waveform for a half cycle time is not divided in its entirety into separate components for each digit electrode and, in contrast, digit and segment drive signals are applied to digit and segment electrodes in such a manner that the digit drive signals applied to all the digit electrodes have potentials equal in level with each other during a prescribed time interval during which the potential of a first segment drive signal inducing a state of non-display at all the digit electrodes is equal to the potential of each of the digit drive signals. During the prescribed time interval, the potential difference between a second segment drive signal inducing a state of display at one of the digit electrodes and a state of non-display at the other digit electrode and each of the digit drive signals is maintained in a first predetermined value whereby the root mean square value over a complete cycle of the potential difference between the second segment drive signal and the digit drive signal applied to the other digit electrodes is substantially equal to that of the potential difference between the first segment drive signal and each of the digit drive signals. During the prescribed time interval, further, the potential difference between a third segment drive signal inducing a state of display at all the digit electrodes and each of the digit drive signals is maintained at a second predetermined value whereby the root mean square value over a complete cycle of the potential difference between the second segment drive signal and the digit drive signal applied to the said one of the digit electrodes is substantially equal to that of the potential difference between the third segment drive signal and each of the digit drive signals.

More specifically, the potential of the first segment drive signal inducing the state of non-display at all of the intersections (hereinafter referred to as display intersections) between the segment and digit electrodes has a level equal to a reference potential which is substantially equal to the mean value of all the digit drive signals. The potential of each digit drive signal in turn is selected to have a value larger than the reference potential during a respective first time interval within one-half of the cycle period. During a second time interval corresponding to the prescribed time interval mentioned above within one-half of the cycle time, the potentials of all the digit drive signals are selected to be equal to each other. The potentials of the segment drive signals inducing the state of display at only the i-th digit's display intersections and the potential of the segment drive signal inducing the state of non-display at the i-th digit's display intersections are selected to be unequal in level during the first time interval. Further, the potential of the second segment drive signal applied to a given segment electrode inducing the state of display at the display intersections of only a given digit electrode is selected to have a level by which the maximum potential difference is provided between the given digit electrode and the given segment electrode. In this case, it is possible to increase the root means square (rms) value of the driving voltage for a state of display by raising the voltage of the segment drive signal in comparison to that of the prior art, or by increasing the driving time interval in which the segment drive signal is applied, or by a combination of such methods. The third segment drive signal inducing the state of display at the display intersections of all the digit electrodes is selected to have a first potential equal to the reference potential during the first time interval and a second potential equal to the maximum value during the second time interval.

A driving method according to the present invention will now be described in general with reference to a matrix in which n=2. A voltage waveform for a digit drive signal impressed upon a digit electrode $r_1$ is expressed by $$V_{r_1} = V_1 + V_o,$$

a voltage waveform for a digit drive signal impressed upon a digit electrode $r_2$ is expressed by $$V_{r_2} = -V_1 + V_o,$$

a voltage waveform for a segment drive signal when display intersections of both digit electrode are to be brought to a state of non-display is expressed by $$VC_o = V_o,$$

a voltage waveform for a segment drive signal indicative of a display state for both digit electrodes is expressed by $$VC_{12} = V_2 + V_o,$$

a voltage waveform for a segment drive signal indicative of a display state for a 1st digit electrode and non-display state for a 2nd digit electrode is expressed by $$VC_1 = -2V_1 + V_o, \text{ and}$$

a voltage waveform for a segment drive signal indicative of a non-display state for a 1st digit electrode and a display state for a 2nd digit electrode is expressed by $$VC_2 = 2V_1 + V_o.$$

Figure 14:
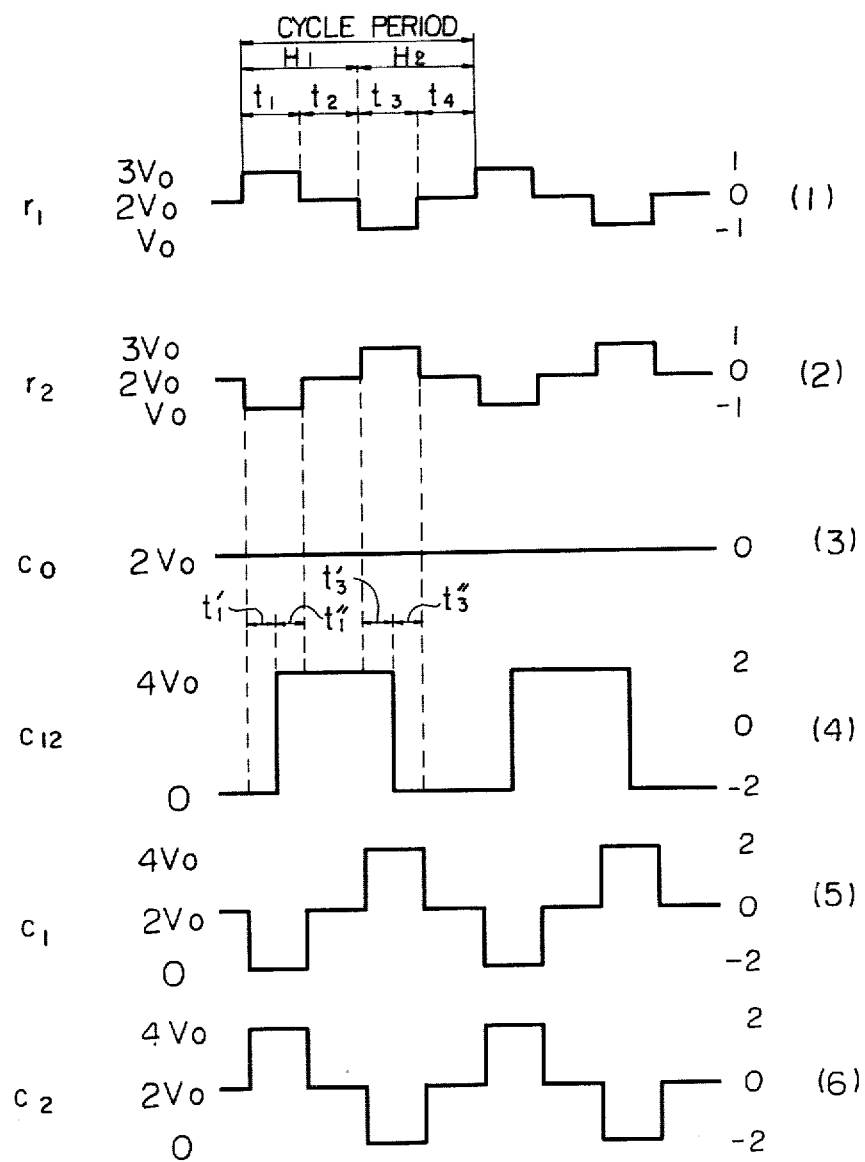
FIG. 14 is a timing chart for another preferred example of digit and segment drive signals according to the present invention.

Here, V1 and V2 are AC voltages which do not include a DC component;
they are chosen so as to satisfy $$\int_\tau V_1 \cdot V_2 \cdot dt = 0$$

$$\int_\tau (V_2)^2 \cdot dt = 8 \int_\tau (V_1)^2 dt$$

for a suitable interval $\tau$. Vo is a function of time or a constant. By way of example, the following possibilities are acceptable: $V_o=0$, $V_1 = \sin \omega t$, and $V_2 = \sqrt{8} \sin \omega/2t$. In such a case the rms value of the driving voltage for the display and non-display states is 3, a significant improvement over the conventional value of $\sqrt{5}$ when n=2. In order to obtain a waveform for a case in which a switchable DC power source is used for the driving operation, it is permissible to adopt a step-like voltage waveform for Vo, V1 and V2. Two such examples are illustrated in FIGS. 11 and 14.

Figure 11:
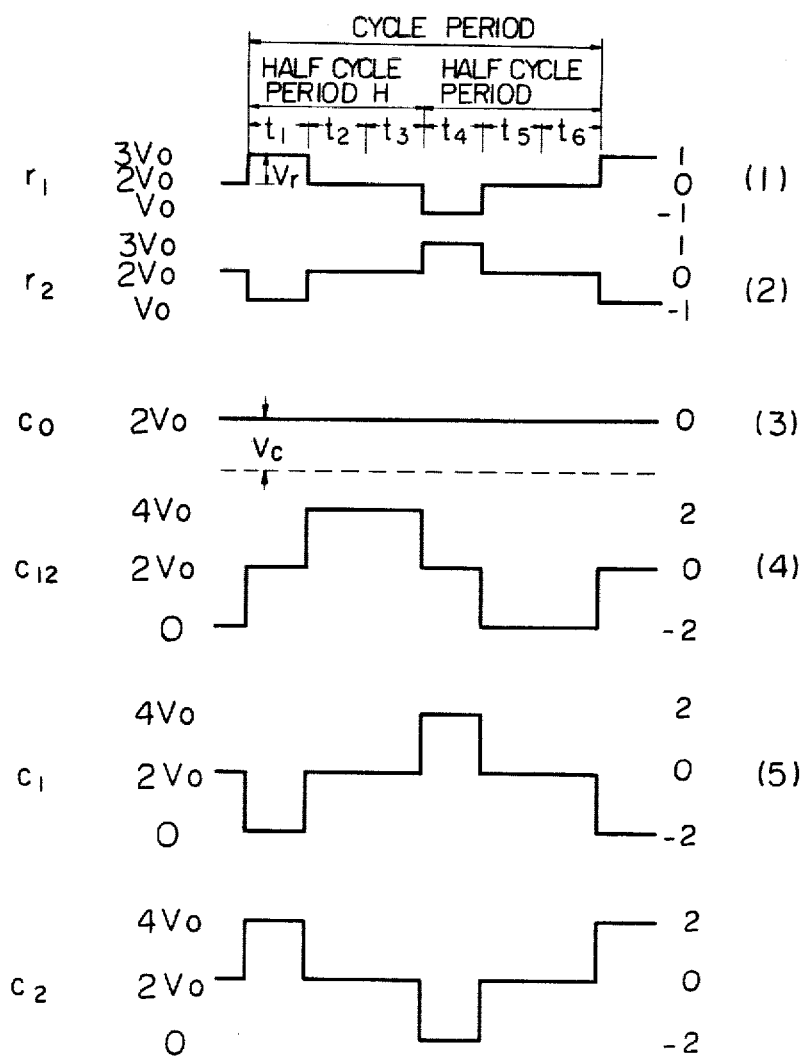
FIG. 11 is a timing chart for a preferred example of digit and segment drive signals used in a method of the present invention.

FIGS. 11(1) and (2) show one preferred example of the waveforms of the digit drive signals which are impressed upon respective digit electrodes $r_1'$ and $r_2'$. In FIG. 11(1) it can be seen that the waveform is composed of six equal time intervals t1, t2, t3, t4, t5 and t6 which constitute one cycle period. The potential levels over these time intervals (hereinafter referred to as t1, t2, t3, t4, t5 and t6) of the $r_1$ digit signal are t1=3 Vo, t2=2 Vo, t4=Vo, t5=2 Vo and t6=2 Vo, while the potentials for the $r_2$ digit signal are t1=Vo, t2=2 Vo, t3=2 Vo, t4=3 Vo, t5=2 Vo and t6=2 Vo all of these potentials being based upon the minimum potential O of the segment drive signal which is taken as a reference potential.

FIGS. 11(3), (4), (5) and (6) show the waveforms of segment drive signals $C_0$, $C_{12}$, $C_1$ and $C_2$ which are impressed upon any segment electrode Sj.

Signal Co in FIG. 11(3) is the waveform of the segment drive signal when a non-display of $r_1Sj$ and $r_2Sj$ is indicated, signal $C_{12}$ in FIG. 11(4) is the waveform of the segment drive signal when $r_1Sj$ and $r_2Sj$ are to be displayed, signal $C_1$ in FIG. 11(5) is the waveform for a display of $r_1Sj$ and a non-display of $r_2Sj$, and signal $C_2$ in FIG. 11(6) is the waveform for a non-display of $r_1Sj$ and a display of $r_2Sj$. In this example, t1 and t4 are the previously described driving intervals for all of the non-display segment signals and at the same time they also correspond to the intervals during which there is a maximum absolute value of the digit driving signal voltage with respect to the reference potential level 2 Vo. Here, the potential levels of the digit drive signals are equal to each other during intervals t2, t3, t5 and t6. In addition, two segment signals are compared and the times at which they do not present the same potential level are t1 and t4 for $C_1$ and $C_2$ and for $C_0$ and $C_1$ and for $C_0$ and $C_2$; all times for $C_1$ and $C_{12}$, $C_2$ and $C_{12}$. Segment signals $C_1$ and $C_2$ possess a higher absolute voltage over the respective intervals t1, t4, and although a large absolute potential difference then exists between $C_1$ and $r_1$ driving signals, a small absolute potential difference exists between $C_1$ and $r_2$ driving signals during the same interval. A large absolute potential difference also exists between $C_{12}$ and $r_1$, $r_2$ digit drive signals during the intervals t2 and t3.

It will now be understood that in accordance with the present invention the digit drive signals $r_1$ and $r_2$ have first and second voltage potentials 3 Vo and Vo which have the same potential difference but opposite in polarity with respect to a reference potential 2 Vo during a first time interval t1 of half cycle period H and have a voltage potential 2 Vo serving as a reference potential during a second time interval t2 or t3 of the half cycle period H, with the reference potential taking a value 2 Vo intermediate between the first and second voltage potentials 3 Vo and Vo. A first segment drive signal Co has a potential level equal to the reference potential 2 Vo during the first and second time intervals t1 and t2, inducing a state of non-display at said display elements on all of said digit electrodes. A second segment drive signal $C_1$ or $C_2$ has a fourth voltage potential 0 or 4 Vo larger in amplitude level than the first and second voltage potentials Vo and 3 Vo during the first time interval t1 and the same potential as the reference potential 2 Vo during the second time interval t2, inducing a state of display at said display elements on one of said digit electrodes. A third segment drive signal $C_{12}$ has the same potential as the reference potential 2 Vo during the first time interval $t_1$ and a voltage potential 4 Vo, during the second and third time intervals t2 and t3, inducing a state of display at said display elements on all of said digit electrodes.

Figure 12:
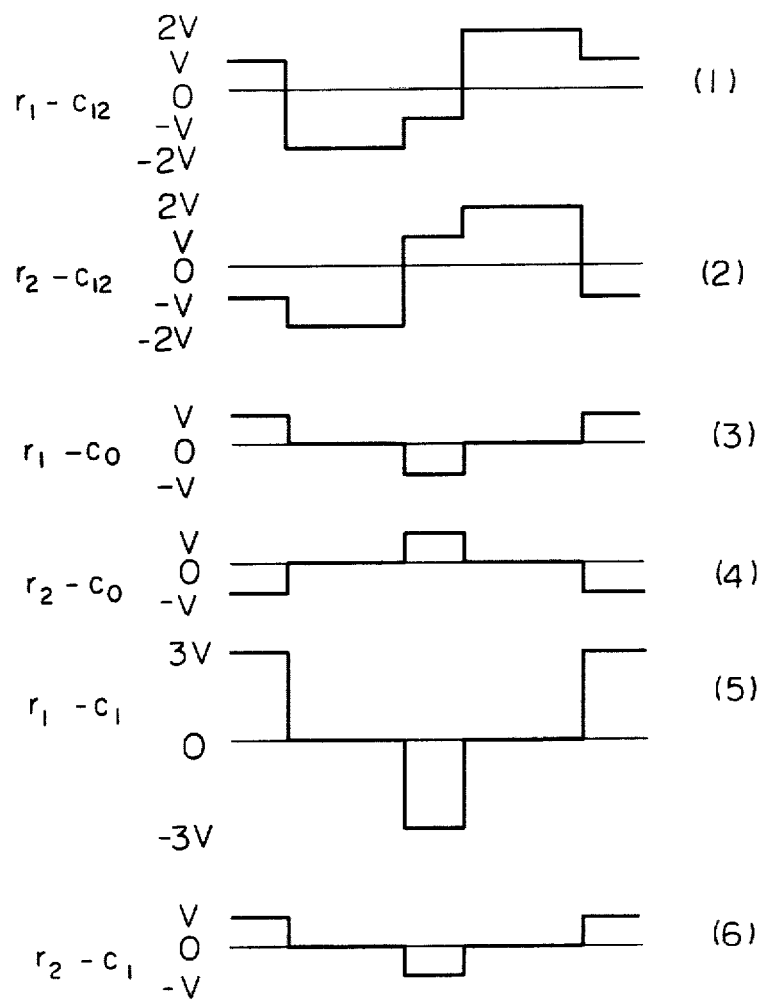
FIG. 12 shows the potential differences across the electrodes applied with the drive signals shown in FIG. 11.

FIG. 12 shows the waveforms for the potential difference across the electrodes. FIGS. 12(1), (2), (3), (4), (5) and (6) are the respective waveforms for the intersections $r_1 \times C_{12}$, $r_2 \times C_{12}$, $r_1 \times C_0$, $r_2 \times C_0$, $r_1 \times C_1$, and $r_2 \times C_1$. If a square wave with a peak value of $\sqrt{8}$ Vo is employed as the $C_{12}$ waveform it is possible to do away with the intervals t2, t3, t5, t6, and 3 can still be obtained as the ratio of the rms value of the display to the non-display driving voltage.

Figure 13:
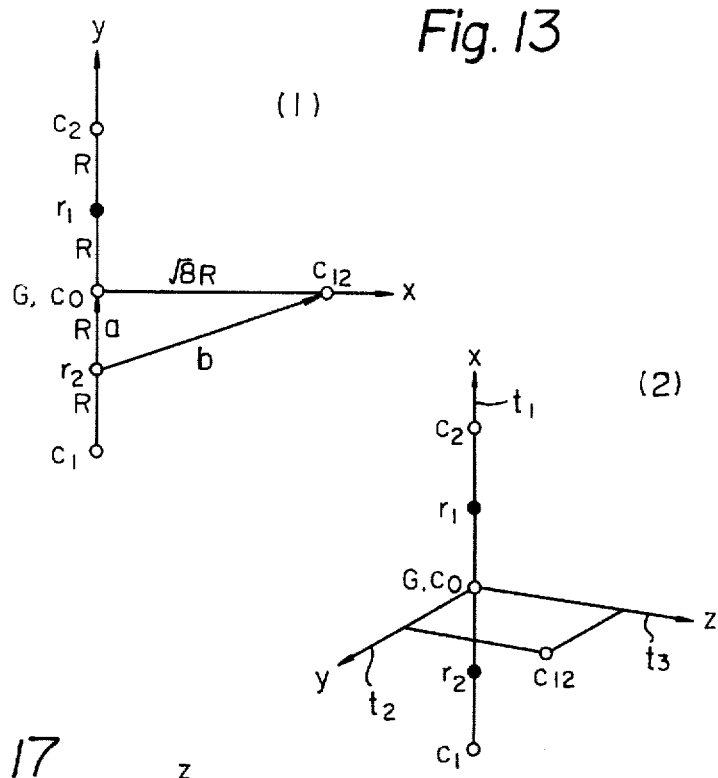
FIG. 13 shows vector diagrams for the drive signals shown in FIG. 11.

FIG. 13 shows the vector diagrams illustrating the relationship between the digit and segment drive signals used in FIG. 11. In FIG. 13, the potential $C_0$, having a value of 2 V, of the segment drive signal $C_0'$ is plotted as a vector at the origin 0 and the potentials 3 V and 4 V are illustrated as having values 1 and 2, respectively, for a sake of simplicity of description. In FIG. 13(1), the potentials $r_1$ and $r_2$ of digit drive signals $r_1$ and $r_2$ are plotted on the Y axis and symmetrical with respect to the potential $C_0$ of the segment drive signal $C_0$ plotted on the intersection between the X and Y axes. Assume that $\overline{r_1 r_2} = 2$ R. In this case, $r_1$ is plotted as a vector on the point (O,R) indicative of the potential, and $r_2$ is plotted as a vector on the point (O, $-$R) indicative of the potential. Plotting $C_2$ as a vector on the point (O,2 R) and $C_1$ on the point (O, $-$2 R), then the following relation holds:

$$|\overline{r_2 C_2}| = |\overline{r_1 C_1}| = 3R$$

Here, the potential differences between $r_1$ and $C_{12}$ and between $r_2$ and $C_{12}$, represented by $\overline{r_1 C_{12}}$ and $\overline{r_2 C_{12}}$, are equal to each other when $C_{12}$ falls on the X axis and the distance between the points $C_0$ and $C_{12}$ is $\sqrt{8}$ R. Therefore, the absolute value of the vector a is equal to R and the absolute value of the vector b is equal to 3 R. From this it will be seen that the operation margin is 3 which is much greater than that obtained in the prior art driving method.

In the vector diagram of FIG. 13(1), since $C_0$ is set to the reference potential 0 to which G is also set, the potential of each point at a certain time instant in interval $t_1$ is expressed as:

$C_1 = -2$
$r_2 = -1$
$C_{12} = 0$
$r_1 = 1$
$C_2 = 2$

From the above equations it will be seen that it is possible practically to obtain driving waveforms with the use of four voltage sources and varying in potential at five different levels.

FIG. 13(2) shows the vector diagram defined in the three dimensions using X, Y and Z axes. In this vector diagram, the time interval $t_1$ is assigned to the X axis, $t_2$ to the Y axis and $t_3$ to the Z axis. The potentials of various drive signals are expressed by the following matrix:

$$\begin{matrix} r_1 & r_2 & C_0 & C_1 & C_2 & C_{12} \\ \begin{pmatrix} 1 & -1 & 0 & -2 & 2 & 0 \\ 0 & 0 & 0 & 0 & 0 & 2 \\ 0 & 0 & 0 & 0 & 0 & 2 \end{pmatrix} \end{matrix}$$

The above relation represents the potentials at the time intervals $t_1$, $t_2$ and $t_3$ which constitutes one-half of cycle time of the drive signals. The potentials in another half cycle time will be obtained by multiplying the value of $-1$ to each of the potentials listed above. It is to be noted that the difference between the potential of the segment drive signal inducing a state of display at one of the digit electrodes and the mean value of all the digit signals is preferably selected to have a value two times the difference between the mean value of the potentials of all the digit drive signals and the potential of the digit drive signal applied to the digit electrode which is to be in a state of display.

FIGS. 14(1) and (2) shows another preferred example of the waveforms of digit drive signals which are impressed upon respective digit electrodes $r_1'$ and $r_2'$. In FIG. 14(1) it can be seen that the waveform is composed of four equal time intervals t1, t2, t3 and t4 which constitute one cycle period. The potential levels over the 1st half cycle time and 2nd half cycle period (hereinafter referred to as t1, t2, t3, and t4) of the $r_1$ digit signal are t1 = 3 Vo, t2 = 2 Vo, t3 = Vo and t4 = 2 Vo, while the potentials for the $r_2$ digit signal are t1 = Vo, t2 = 2 Vo, $t_3 = 3$ Vo and $t_4 = 2$ Vo, all of these potentials being based upon the minimum potential of the segment driving signal which is taken as a standard.

FIGS. 14(3), (4), (5) and (6) show the waveforms of the segment drive signals which are impressed upon any segment electrode Sj.

Signal $C_0$ in FIG. 14(3) is the waveform of the segment electrode driving signal when a non-display of $r_1 Sj$ and $r_2 Sj$ is indicated, signal $C_{12}$ in FIG. 14(4) is the waveform of the segment electrode driving signal when $r_1 Sj$ and $r_2 Sj$ are to be displayed, signal $C_1$ in FIG. 14(5) is the waveform for a display of $r_1 Sj$ and a non-display of $r_2 Sj$, and signal $C_2$ in FIG. 14(6) is the waveform for a non-display of $r_1 Sj$ and a display of $r_2 Sj$. In this example, t1 and t3 are the previously described driving intervals for all of the non-display segment signals and at the same time they also correspond to the intervals during which there is an increase in the absolute value of the digit driving signal voltage with respect to the reference potential level 2 Vo. Here, the potential levels of the two digit drive signals are equal to each other during intervals t2 and t4. In addition, two segment signals are compared and the times at which they do not present the same potential level are $t_1$ and $t_3$ for $c_0$ and $c_1$, $c_0$ and $c_2$, $t_1'''$, $t_2$ and $t_3''$ for $c_1$ and $c_{12}$, $t_1'$, $t_2$ and $t_3'$ for $c_2$ and $c_{12}$. Segment signals $c_1$ and $c_2$ possess a higher absolute voltage of over the intervals $t_1$, $t_3$ than is the case with the prior art, and although a large driving voltage is generated between $c_1$ and the $r_1$ driving signal, a small driving voltage generated between $c_1$ and $r_2$ driving signal over the same interval will suffice. A large driving voltage is also generated between $c_{12}$ and the $r_1$, $r_2$ digit driving signals over the intervals $t_2$, $t_4$ as well as $t_1$, $t_3$. It is to be understood that FIGS. 11 and 14 show examples in which the potential of the segment drive signal inducing the state of non-display at display intersections of all the digit electrodes is equal to the mean value of the potentials of all the digit drive signals, i.e., the vector $C_0$ is brought into coincidence with the vector G and the vectors $C_1$, $r_1$ and G are disposed on the same axis.

In FIG. 14, more specifically, the first digit drive signal $r_1$ has a first voltage potential 3 $V_O$ during a first time interval $t_1$ of a first half cycle period $H_1$ and a reference potential 2 $V_O$ during a second or remaining time interval $t_2$ of the first half cycle period $H_1$. The second digit drive signal $r_2$ has a second voltage potential $V_O$ which is opposite in polarity to the voltage potential 3 $V_O$ of the first digit drive signal $r_1$ during the first time interval $t_1$. During a first time interval $t_3$ of another half cycle period $H_2$ the first digit drive signal $r_1$ has a voltage potential $V_O$, and the second digit drive signal $r_2$ has a voltage potential 3 $V_O$, which provides the same voltage difference as that between 2 $V_O$ and $V_O$ and is opposite in polarity to the voltage potential $V_O$ of the first digit drive signal $r_1$ with respect to the reference potential 2 $V_O$. During the second time interval $t_4$ of another half cycle period $H_2$, the first and second digit drive signals $r_1$ and $r_2$ have the reference potential 2 $V_O$. A segment drive signal $C_0$ has a voltage potential equal to the reference potential 2 $V_O$ during the first and second time intervals $t_1$ and $t_2$ of the first half cycle period $H_1$ and during the first and second time intervals $t_3$ and $t_4$ of another half cycle period $H_2$, inducing a state of non-display at display elements on all of the digit electrodes because of a minimum potential difference between the digit electrodes and the segment electrodes as seen in FIGS. 15(3) and (4). A segment signal $C_{12}$ has a voltage potential 0 during a time period $t_1$, of the first time interval $t_1$ of the half cycle period $H_1$ and a voltage potential 4 $V_O$ during another time period $t_1$ of the first time interval $t_1$. During the second time interval $t_2$ of the first half cycle period $H_1$ the segment drive signal $C_{12}$ has the voltage potential 4 $V_O$, so that the maximum potential difference exists between the digit and segment electrodes as shown in FIGS. 15(1) and (2), inducing a state of display at display elements on all the digit electrodes. The segment drive signal $C_1$ has a voltage potential 0 during the first time interval $t_1$ of the first half cycle period $H_1$, a voltage potential 2 $V_O$ during the second time interval $t_2$ of the first half cycle period $H_1$, a voltage potential 4 $V_O$ during the first time interval $t_3$ of the second half cycle period $H_2$, and a voltage potential 2 $V_O$ during the second time interval $t_4$ of the second half cycle period $H_2$. Thus, the maximum potential difference exists between the segment drive signal $r_1$ and the digit drive signal $r_1$, inducing a state of display at display elements on the first digit electrode applied with digit drive signal $r_1$. The segment drive signal $c_2$ has a voltage potential 4 $V_O$ during the first time interval $t_1$ of the first half cycle period $H_1$, a voltage potential 2 $V_O$ during the second time interval $t_2$ of the first half cycle period $H_1$, a voltage potential 0 during the first time interval $t_3$ of the second half cycle period $H_2$, and a voltage potential 2 $V_O$ during the second time interval $H_2$ of the second half cycle period $H_2$. Thus, the maximum potential difference exists between the segment drive signal $C_2$ and the digit drive signal $r_2$, inducing the state of display at the display elements on the digit electrode applied with digit drive signal $r_2$. It will thus be seen that during the second time intervals $t_2$ and $t_4$ of the first and second half cycle periods $H_1$ and $H_2$ the segment drive signals $c_1$ and $c_2$ have the voltage potential equal to the reference voltage potential, but during the first time intervals $t_1$ and $t_3$ of the half cycle periods the segment drive signals $c_1$ and $c_2$ have the voltage potential 0 or 4 $V_O$.

FIGS. 15(1), (2), (3), (4), (5) and (6) are the respective waveforms for the intersections $c_{12} \times r_1$, $c_{12} \times r_2$, $c_0 \times r_2$, $c_0 \times r_1$, $c_2 \times r_1$, $c_2 \times r_2$. If a square wave with a peak value of $\sqrt{8}$ Vo is employed as the $c_{12}$ waveform, it is possible to do away with the intervals $t_2$, $t_4$, and 3 can still be obtained as the ratio of the root mean square value of the display to the non-display driving voltage.

FIG. 16 shows another example of the waveform diagram for drive signals. In the example of FIG. 16, each of the digit drive signals $r_1$ and $r_2$ have a reference voltage potential 2 $V_O$ during a first half cycle $H_1$ of a cycle period and a reference voltage potential $V_O$ during a second half cycle time $H_2$. During a first time interval $t_1$ of the first half cycle time $H_1$, the first digit drive signal $r_1$ has a voltage potential 3 $V_O$ and the second digit drive signal $r_2$ has a voltage potential $V_O$ which provides the same voltage difference as that between the potential 3 $V_O$ of the first digit drive signal $r_1$ and the reference potential 2 $V_O$ during the first time interval $t_1$. During the second time interval $t_2$ of the first half cycle time $H_1$, both the first and second digit drive signals $r_1$ and $r_2$ have the voltage potential equal to the reference voltage potential 2 $V_O$. During a third time interval $t_3$ of the first half cycle time $H_1$, the first digit drive signal $r_1$ has a voltage potential $v_O$ and the second digit drive signal $r_2$ has a voltage potential 3 $V_O$ of the same potential difference as that of the first digit drive signal $r_1$ relative to the reference potential 2 $V_O$ but opposite in polarity with respect to the reference potential 2 $V_O$. As previously noted, the reference voltage potential of the first and second digit drive signals $r_1$ and $r_2$ is $V_O$ during the second half cycle time $H_2$. During a first time interval $t_4$ of the second half cycle time $H_2$, the first digit drive signal $r_1$ has a voltage potential 0 and the second digit drive signal $r_2$ has a voltage 2 $V_O$ of the same potential difference as that of the first digit drive signal $r_1$ but opposite in polarity to the first digit drive signal $r_1$ with respect to the reference potential $V_O$. During a second time interval $t_5$ of the second half cycle time $H_2$, the first and second digit drive signals $r_1$ and $r_2$ have a voltage potential equal to the reference potential $V_O$. During a third time interval $t_6$ of the second half cycle time $H_2$, the first digit drive signal $r_1$ has a voltage potential 2 $V_O$ and the second digit drive signal $r_2$ has a voltage potential 0 of the same potential difference as that of the first digit drive signal $r_1$ but opposite in polarity thereto with respect to the reference potential $V_0$.

Figure 18:
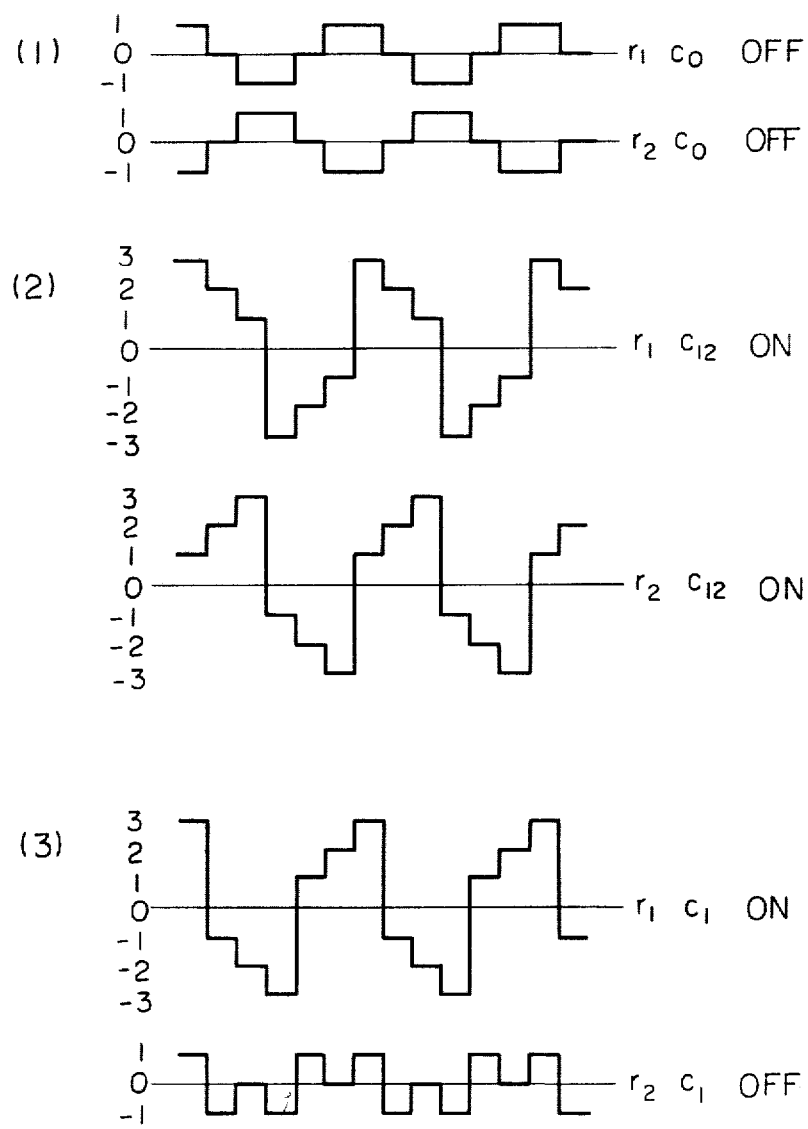
FIG. 18 shows the potential differences across the electrodes applied with the drive signals shown in FIG. 17.

In FIG. 16, a segment drive signal $C_0$ has a voltage potential equal to the reference potential 2 $V_O$ of the digit drive signals during the first half cycle time $H_1$ and has a voltage potential equal to the reference potential $V_O$ of the digit drive signals during the second half cycle time $H_2$, providing a minimum voltage difference between the digit drive signal and the segment drive signal $C_0$, as shown in FIG. 18(1), to induce a state of non-display at display elements on all of the digit electrodes. A segment drive signal $C_{12}$ has a voltage potential 0 during the first half cycle time $H_1$ and has a voltage potential 3 $V_O$ during the second half cycle time $H_2$, providing a maximum voltage difference between the segment drive signal $C_{12}$ and either one of the first and second digit drive signals $r_1$ and $r_2$, as shown in FIG. 18(2) to induce a state of display at all the display elements on both the first and second digit electrodes. A third segment drive signal $C_1$ has a voltage potential 0 during the first time interval $t_1$ of the first half cycle time $H_1$ and a voltage potential 3 $V_O$ during the second and third time intervals $t_2$ and $t_3$ of the first half cycle time $H_1$. The segment drive signal $C_1$ has a voltage potential 3 $V_O$ during the first time interval $t_4$ of the second half cycle time $H_2$ and a voltage potential 0 during the second and third time intervals $t_5$ and $t_6$ of the second half cycle time $H_2$, providing a maximum voltage difference between the first digit drive signal and the segment drive signal $C_1$ and a minimum voltage difference between the digit drive signal $r_2$ and the segment drive signal $c_2$ as shown in FIG. 18(3). In this case, the display elements associated with the first digit electrode applied with the first digit drive signal $r_1$ are turned on while the display elements associated with the second digit electrode applied with the second digit drive signal $r_2$ are turned off. Similarly, a segment drive signal $c_2$ has a voltage potential 3 $V_O$ during the first and second time intervals $t_1$ and $t_2$ of the first half cycle time $H_1$ and a voltage potential 0 during the third time interval $t_3$ of the first half cycle time $H_1$. The segment drive signal $c_2$ also has a voltage potential 0 during the first and second time intervals $t_4$ and $t_5$ of the second half cycle time and a voltage potential 3 $V_O$ during the third time interval $t_6$ of the second half cycle time $H_2$. Thus, a maximum voltage difference is provided between the segment drive signal $c_2$ and the digit drive signal $r_2$ while a minimum voltage difference is provided between the segment drive signal $c_2$ and the digit drive signal $r_1$, as shown in FIG. 18(3). In this instance, the display elements associated with the digit electrode applied with the digit drive signal $r_2$ are turned on while the display elements associated with the digit electrode applied with the digit drive signal $r_1$ are turned off.

FIGS. 16(1) and (2) show digit driving waveforms which are applied to respective digit electrodes $r_1'$ and $r_2'$. In FIG. 16(1) it can be seen that the waveform is composed of 6 equal time intervals $t_1$, $t_2$, $t_3$, $t_4$, $t_5$, and $t_6$ which constitute one period. The potential levels over the 1st half cycle time $H_1$ and 2nd half cycle time $H_2$ (hereinafter referred to as $t_1$, $t_2$, ... $t_6$) of the $r_1$ digit signal are $t_1 = 3$ Vo, $t_2 = 2$ Vo, $t_3 = $ Vo, $t_4 = 0$, $t_5 = $ Vo, and $t_6 = 2$ Vo, while the potentials for the D2 digit signal are $t_1 = $ Vo, $t_2 = 2$ Vo, $t_3 = 3$ Vo, $t_4 = 2$ Vo, $t_5 = $ Vo, and $t_6 = 0$, all of these potentials being based upon Vo which is taken as a reference potential. If the potentials over each of the intervals $t_1$, $t_2$... for the $r_1$ digit signal and $r_2$ digit signal are added, we are left with $t_1 = 4$ Vo, $t_2 = 4$ Vo, $t_3 = 4$ Vo, $t_42$ Vo, $t_52$ Vo, and $t_6 = 2$ Vo. If a comparison is made to the waveforms shown in FIG. 8, it will be seen that in FIG. 16 intervals $t_2$ and $t_5$ have been added; in other words, intervals have been added over which the potentials of the $r_1$ and $r_2$ digit signals coincide.

FIG. 16(3), (4), (5) and (6) show the waveforms which are impressed upon any segment electrode $S_j$. Signal Co in FIG. 16(3) is the waveform of the segment electrode driving signal when a non-display of $r_1Sj$ and $r_2Sj$ is indicated, signal $c_{12}$ in FIG. 16(4) is the waveform of the segment electrode driving signal when $r_1Sj$ and $r_2Sj$ are to be displayed, signal $c_1'$ in FIG. 16(5) is the waveform for a display of $r_1Sj$ and a non-display of $r_2Sj$, and signal $c_2'$ in FIG. 16(6) is the waveform for a non-display of $r_1Sj$ and a display of $r_2Sj$. The segment electrode driving signals which satisfy all states are a combination of the potentials (Vo-2 Vo) and (0-3 Vo), and their frequency is the same as the frequency of the digit driving signals.

Figure 17:
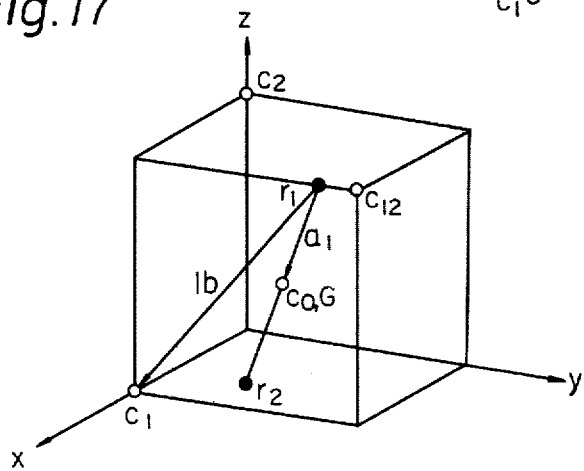
FIG. 17 is a vector diagram for one of the drive signals shown in FIG. 16.

FIG. 17 show the vector diagram for the drive signals shown in FIG. 16. Here, the potentials of the various drive signals are expressed by the following matrix:

$$\begin{pmatrix} r_1 & r_2 & c_0 & c_1 & c_2 & c_{12} \end{pmatrix}$$
$$= \begin{pmatrix} 0 & 2 & 1 & 3 & 0 & 3 \\ 1 & 1 & 1 & 0 & 0 & 3 \\ 2 & 0 & 1 & 0 & 3 & 3 \end{pmatrix}$$

In this case, the vectors a and b are written as:

$$|a| = \sqrt{1^2 + 1^2} = \sqrt{2}$$
$$|b| = \sqrt{3^2 + 2^2 + 1^2} = \sqrt{14}$$

Therefore, the operation margin $\alpha$ is obtainerd as:

$$\alpha = \sqrt{7}$$

In this example, the varying potential $C_0$ of the segment drive signal $C_0'$ is plotted as a vector at a point intermediate between potentials $r_1$ and $r_2$ and coincides with G; Angle $C_1Gr_1$ and $C_2Gr_2$ define obtuse angles. This means that the potential of the segment drive signal inducing a state of non-display at all the digit electrodes is equal to the mean value of the potentials of all the digit drive signals.

It can thus be understood that the driving method of the present invention, in contrast to that of the prior art, is provided with intervals over which there is coincidence between the phases of the digit electrode driving signals as well as coincidence between their potentials. In this case, if a non-display is indicated for segments at matrix intersections, the segment electrodes may be applied with a voltage at the same level as the digit signal potentials when these potentials are in coincidence, whereas they are applied with differing voltage levels at other times. It should be appreciated that in the examples of FIGS. 11 and 14 the digit and segment drive signals have five potential levels different from each other by equal steps and in the example of FIG. 16 the digit and segment drive signals have four potential levels differing from each other by equal steps.

FIG. 18 shows the waveforms which appear across the electrodes in a case where the waveforms of FIG. 17 are applied to a liquid crystal. FIG. 18(1) shows examples of potential waveforms between digit and segment electrodes when a state of non-display is desired at all of the digit electrodes, and FIG. 18(2) examples in which a display is desired at all of the digit electrodes. FIG. 18(3) shows an example in which a display is desired at the first digit electrodes and a state of non-display is desired at the second digit electrode.

In FIG. 18(2) the rms voltage is $\sqrt{14/3}\ V_O$, while the rms voltage is $\sqrt{\frac{2}{3}}\ V_O$ according to FIG. 18(1), thereby giving an operation margin of $\alpha = \sqrt{7}$. In other words, the operation margin can be widened from $\sqrt{5}$ to $\sqrt{7}$ by providing an interval over which the potential levels of the two digit driving signals of FIG. 17 coincide.

Figure 19:
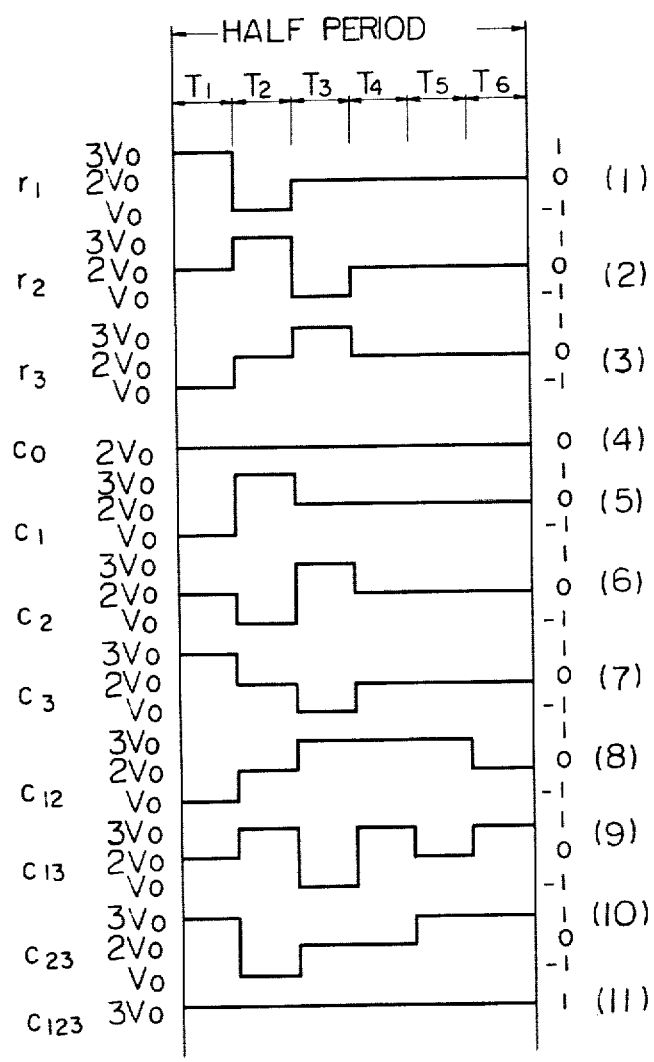
FIG. 19A is a timing chart for another preferred example of digit and segment drive signals according to the present invention.
FIG. 19B is a schematic view of an example of an electro-optical display device arranged in a matrix configuration for the digit and segment drive signals shown in FIG. 19A.

FIG. 19A shows the waveform diagram of other example of driving signals used in the method of the present invention with $n=3$. In the waveform diagram of FIG. 19A, a digit drive signal $r_2$ has a reference voltage potential $2\ V_O$ and digit drive signals $r_1$ and $r_3$ have voltage potentials $3\ V_O$ and $V_O$, respectively, during a first time interval $t_1$ of a half cycle period, with the voltage potentials $3\ V_O$ and $V_O$ being of the same amplitude level relative to the reference voltage potential $2\ V_O$ but opposite in polarity to one another with respect to the reference voltage potential $2\ V_O$. During a second time interval $t_2$ of the half cycle period, the digit drive signal $r_3$ has a voltage potential equal to the reference potential $2\ V_O$ and the digit drive signals $r_1$ and $r_2$ have voltage potentials $V_O$ and $3\ V_O$, respectively, which have the same potential difference relative to the reference potential $2\ V_O$ and are opposite in polarity to one another with respect to the reference potential $2\ V_O$. During a third time interval of the half cycle period, the digit drive signal $r_1$ has the reference potential and the digit drive signals $r_2$ and $r_3$ have the voltage potentials $V_O$ and $3\ V_O$, respectively, which have the same potential difference relative to the reference potential $2\ V_O$ but are opposite in polarity to one another with respect to the reference potential $2\ V_O$. During fourth to six time intervals $t_4$ to $t_6$, all of the digit drive signals $r_1$ to $r_3$ have the reference potential $2\ V_O$.

Figure 20:
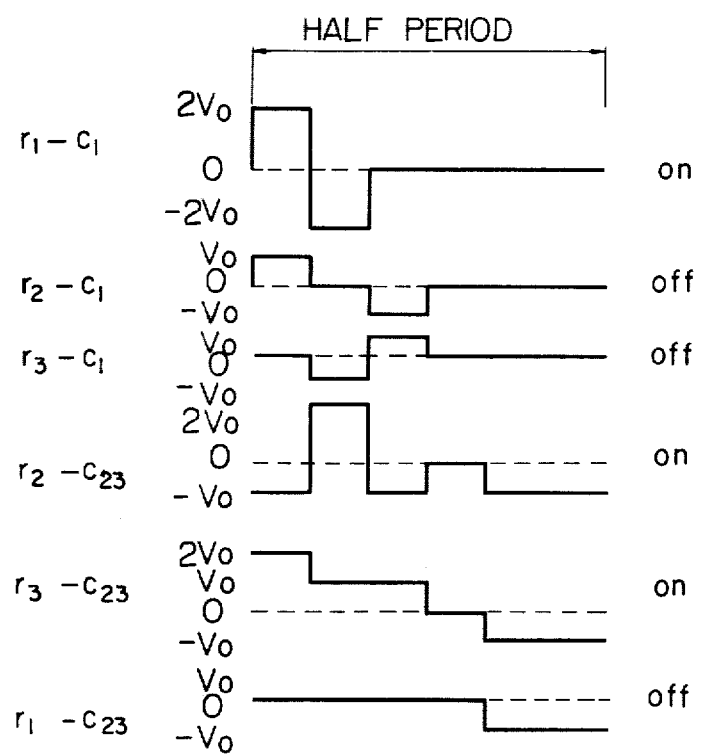
FIG. 20 shows the potential differences across the electrodes applied with the drive signals shown in FIG. 19.

In FIG. 19A, a segment drive signal $c_0$ has a voltage potential equal to the reference potential $2\ V_O$ during all of the time intervals $t_1$ through $t_6$ of the half cycle period, providing a minimum voltage difference between the segment drive signal $c_0$ and any one of the digit drive signals $r_1$ and $r_2$ to induce a state of non-display at all the display elements associated with the digit electrodes applied with the digit drive signals $r_1$ through $r_3$. A segment drive signal $c_1$ has such a voltage potential to provide a maximum voltage difference between the segment drive signal $c_1$ and the digit drive signal $r_1$ to induce a state of display at the display elements associated with only the digit electrode applied with the digit drive signal $r_1$. More specifically, the segment drive signal $c_1$ has a voltage potential $V_O$ during the first time interval $t_1$ and a voltage potential $3\ V_O$ during the second time interval $t_2$. During the remaining time intervals $t_3$ through $t_6$, the segment drive signal $c_1$ has a reference voltage $2\ V_O$. Thus, a maximum voltage difference is provided between the first digit drive signal $r_1$ and the segment drive signal $c_1$ during the first and second time intervals $t_1$ and $t_2$ as shown in FIG. 20 so that the display elements associated with the digit electrode applied with the digit drive signal $r_1$ are turned on during the first and second time intervals $t_1$ and $t_2$. During the remaining time intervals $t_3$ through $t_6$, a minimum voltage difference is provided between the segment drive signal $c_1$ and the digit drive signal $r_1$ so that the display elements associated with the digit electrode applied with the digit drive signal $r_1$ are turned off during the time intervals $t_3$ through $t_6$. A voltage difference between the digit drive signal $r_2$ and the segment drive signal $c_1$ exists as shown in the waveform $r_2-c_1$ of FIG. 20 and the display elements are turned off. Likewise, a voltage difference exists between the digit drive signal $r_3$ and the segment drive signal $c_1$ as shown by the waveform $r_3-c_1$ of FIG. 20 and the display elements are turned off. A segment drive signal $c_2$ has voltage potentials of such a value to provide a maximum voltage difference between the segment drive signal $c_2$ and the digit drive signal $r_2$ during the time intervals $t_2$ and $t_3$ of the half cycle period.

FIGS. 19A(4), (5), (6), (7), (8), (9), (10) and (11) show the waveforms which are impressed upon any segment electrode Sj. Signal Co in FIG. 19A(4) is the waveform of the segment electrode driving signal when a non-display of $r_1Sj$, $r_2Sj$ and $r_3Sj$ is indicated, signal $c_{12}$ in FIG. 19A(8) is the waveform of the segment electrode driving signal when $r_1sj$ and $r_2Sj$ are to be displayed and $r_3Sj$ is to be non-displayed, signal $c_1$ in FIG. 19A(5) is the waveform for a display of $r_1Sj$ and a non-display of $r_2Sj$ and $r_3Sj$, and signal $c_2$ in FIG. 19A(6) is the waveform for a non-display of $r_1Sj$ and $r_3Sj$ and a display of $r_2Sj$.

Similarly, signal $C_3$ in FIG. 19A(7) is the waveform for a display of $r_3Sj$ and a non-display of $r_1Sj$ and $r_2Sj$, signal $C_{13}$ in FIG. 19A(9) is the waveform for a display of $r_1Sj$ and $r_3Sj$ and a non-display of $r_2Sj$, signal $C_{23}$ in FIG. 19A(10) is the waveform for a display of $r_2Sj$ and $r_3Sj$ and a non-display of $r_1Sj$, and signal $C_{123}$ in FIG. 19A(11) is the waveform for a display of $r_1Sj$, $r_2Sj$ and $r_3Sj$.

It is to be appreciated that in the example of FIG. 19A, the difference between the potential of the segment drive signal inducing a state of display at one of the digit electrodes and the potential of the mean value of all the digit drive signals is equal to the potential difference between the mean value of the potentials of all the digit drive signals and the potential of the digit drive signal applied to the digit electrode which is to be in a state of display. It should also be appreciated that the digit drive signals $r_1$, $r_2$ and $r_3$ have first, second and third potential levels Vo, $2\ Vo$ and $3\ Vo$, respectively, and that the three digit drive signals concurrently have the different potential levels during the time intervals $t_1$, $t_2$ and $t_3$ and have the same potential level during the time intervals $t_4$, $t_5$ and $t_6$.

FIG. 19B shows a model matrix layout for the digit and segment drive signals shown in FIG. 19A, wherein the three digit electrodes are employed.

FIG. 20 shows an example of the waveforms for the potential difference across the digit and segment electrodes with the drive signals used in FIG. 19A.

Figure 21:
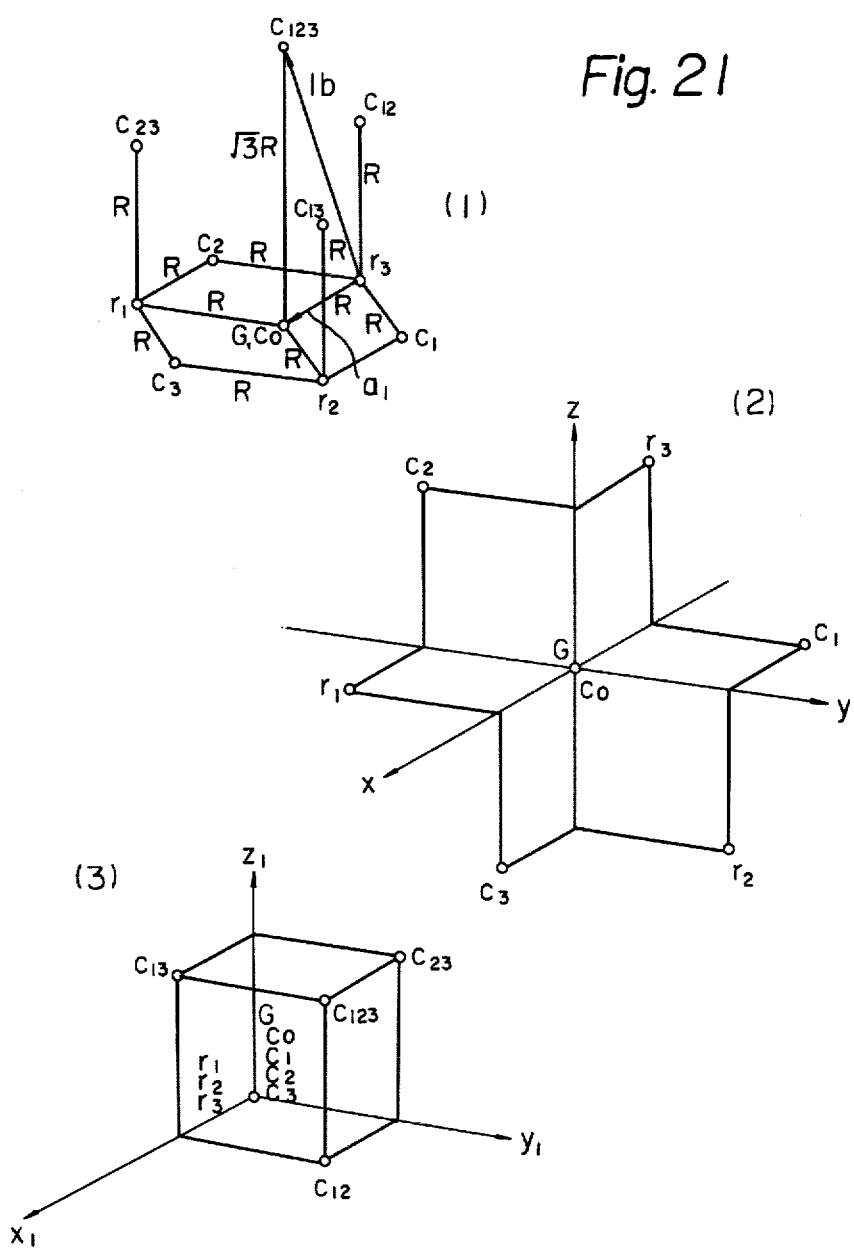
FIG. 21 shows the vector diagrams for the drive signals shown in FIG. 19.

FIG. 21(1) shows the vector diagram for the drive signals shown in FIG. 19A. In FIG. 21(1), a varying potential $C_0$ of the segment drive signal $C_0'$ indicative of the non-display state of all the digit electrodes $r_1'$, $r_2'$ and $r_3'$ is plotted as a vector at a potential intermediate among potentials $r_1$, $r_2$ and $r_3$ of the digit drive signals $r_1'$, $r_2'$ and $r_3'$. Let $\overline{C_0 r_1} = \overline{C_0 r_2} = \overline{C_0 r_3} = R$. $r_1 r_2 r_3$ define an equilateral triangle about $C_0$ as a center with the line segment having the length of $\sqrt{3} \cdot R$. In this case, $C_1$ $C_2$ $C_3$ are expressed as:

$$|\overline{r_1 C_3}| = |\overline{r_2 C_3}| = |\overline{r_2 C_1}| = |\overline{r_3 C_1}| = |\overline{r_3 C_2}| = |\overline{r_1 C_2}| = R$$

Therefore, $r_1 C_3 r_2 C_1 r_3 C_2$ define an equilateral hexagon about $C_0$ as a center. Each point of $C_{12}$, $C_{13}$, $C_{23}$, $C_{123}$ are selected such that $\overline{r_1 C_{23}} = R$ and $\overline{r_2 C_{23}} = \overline{r_3 C_{23}}$. The point of $C_{123}$ is selected such that $\overline{r_1 C_{123}} = \overline{r_2 C_{123}} = \overline{r_3 C_{123}}$. The vectors a and b are expressed as:

$$|a| = R$$

$$|b| = 2R$$

Therefore, the operation margin $\alpha$ is obtained as:

$$\alpha = 2$$

FIG. 21(2) shows an example of the diagram in which the arrangement of FIG. 21(1) is applied to the points of a three-dimentional lattice. In FIG. 21(2) potentials $C_{12}$, $C_{13}$, $C_{23}$ and $C_{123}$ of the corresponding segment drive signals $C_{12}'$, $C_{13}'$, $C_{23}'$ and $C_{123}'$ can be represented as vectors at points within three-dimensional space; however, by doing so the points indicative of potentials will no longer rest at the points of a regular lattice. In order to permit the potential indicating points to lie at the points of a regular lattice, at least 4-dimensions are required. Therefore, the potentials $r_1$, $r_2$, $r_3$, $C_0$, $C_1$, $C_2$ and $C_3$ are plotted as vectors on the X, Y and Z axes. FIG. 21(3) shows an example of the diagram in which $C_{12}$, $C_{13}$, $C_{23}$ and $C_{123}$ lie on the regular lattice defined by the X', Y' and Z' axes with the potentials $r_1$, $r_2$, $r_3$, $C_0$, $C_1$, $C_2$ and $C_3$ being at the origin of the X', Y' and Z' axes. If the matrix is used to show this, the following is the result:

$$\begin{pmatrix} r_1 & r_2 & r_3 & C_0 & C_1 & C_2 & C_3 & C_{12} & C_{13} & C_{23} & C_{123} \\ 1 & 0 & -1 & 0 & -1 & 0 & 1 & -1 & 0 & 1 & 1 \\ -1 & 1 & 0 & 0 & 1 & -1 & 0 & 0 & 1 & -1 & 1 \\ 0 & -1 & 1 & 0 & 0 & 1 & -1 & 1 & -1 & 0 & 1 \\ 0 & 0 & 0 & 0 & 0 & 0 & 0 & 1 & 1 & 0 & 1 \\ 0 & 0 & 0 & 0 & 0 & 0 & 0 & 1 & 0 & 1 & 1 \\ 0 & 0 & 0 & 0 & 0 & 0 & 0 & 1 & 1 & 1 & 1 \end{pmatrix}$$

From the above it will be seen that the half frame time consists of six equal time intervals $t_1$ through $t_6$. The potentials for the remaining frame time can be obtained by multiplying each element of the above matrix by $-1$. It should now be understood that in FIG. 21(2) the potentials $C_0$, $C_1$, $C_2$ and $C_3$ are plotted in terms of the time $t_1$, $t_2$ and $t_3$ assigned to the X, Y and Z axes whereas in FIG. 21(3) the potentials $C_{12}$, $C_{13}$, $C_{23}$ and $C_{123}$ are plotted in terms of the times $t_4$, $t_5$ and $t_6$ assigned to the X', Y' and Z' axes.

It will now be appreciated that the waveforms of the matrix drive signals can be represented in vector space as previously noted. The set of digit drive signals capable of displaying a complete pattern is given by:

$$1/T \int^T r_i^2 dt = R^2$$

$$1/T \int^T r_i r_j dt = -R^2/n - 1$$

Therefore, the digit drive signal is located on the surface of a sphere of radius R with the origin as a center. It can be understood from $$\frac{1}{T} \int^T (r_i - r_j)^2 dt = \frac{1}{T} \int^T r_i^2 dt - \frac{2}{T} \int^T r_i r_j dt + \frac{1}{T} \int^T r_j^2 dt = \frac{2n}{n-1} R^2$$

that the distance between mutual drive signals is given by $\sqrt{2n/n - 1}R$. For a two-digit matrix, $r_1$ and $r_2$ become points of symmetry with respect to the origin. For a three-digit matrix, $r_1$, $r_2$, $r_3$ define an equilateral triangle with a side of $\sqrt{3}$ R. For a four-digit matrix, the points lie at the corners of an equilateral tetrahedron. In the case of an n-digit matrix, the points lie at the apices of an equilateral $n(n-1)(n-2)/6$ body in the $n-1$ dimension space. It can be understood that the digit drive signals of the prior art satisfy these conditions. Hereinafter such digit drive signals will be referred to as digit drive signals which possess symmetry.

The segment drive signal Cm which displays the worst pattern is given by:

$$Cm = -A \Sigma r_i = -\sqrt{\frac{n-1}{m(n-m)}} \sum_i r_i$$

$$= -\sqrt{\frac{m(n-1)}{n-m}} \cdot \frac{\Sigma r_i}{m}$$

Where $\Sigma$ is the sum total with regard to digit electrodes which are to be in the state of display. Therefore, the segment drive signal Cm can readily be obtained from the position of the centroid $\Sigma r_i/m$ of the digit drive signal for the digit electrode which is to be in the state of display. It can be understood that the varying potential difference between the potential of the segment drive signal inducing a state of display at one of the digit electrodes and the mean value of the potentials of all the digit electrodes is in a proportional relationship with the varying potential difference between the mean value of the potential of all the digit drive signals and the potential of the digit drive signal applied to the digit electrode which is to be in a state of display.

Figure 22:
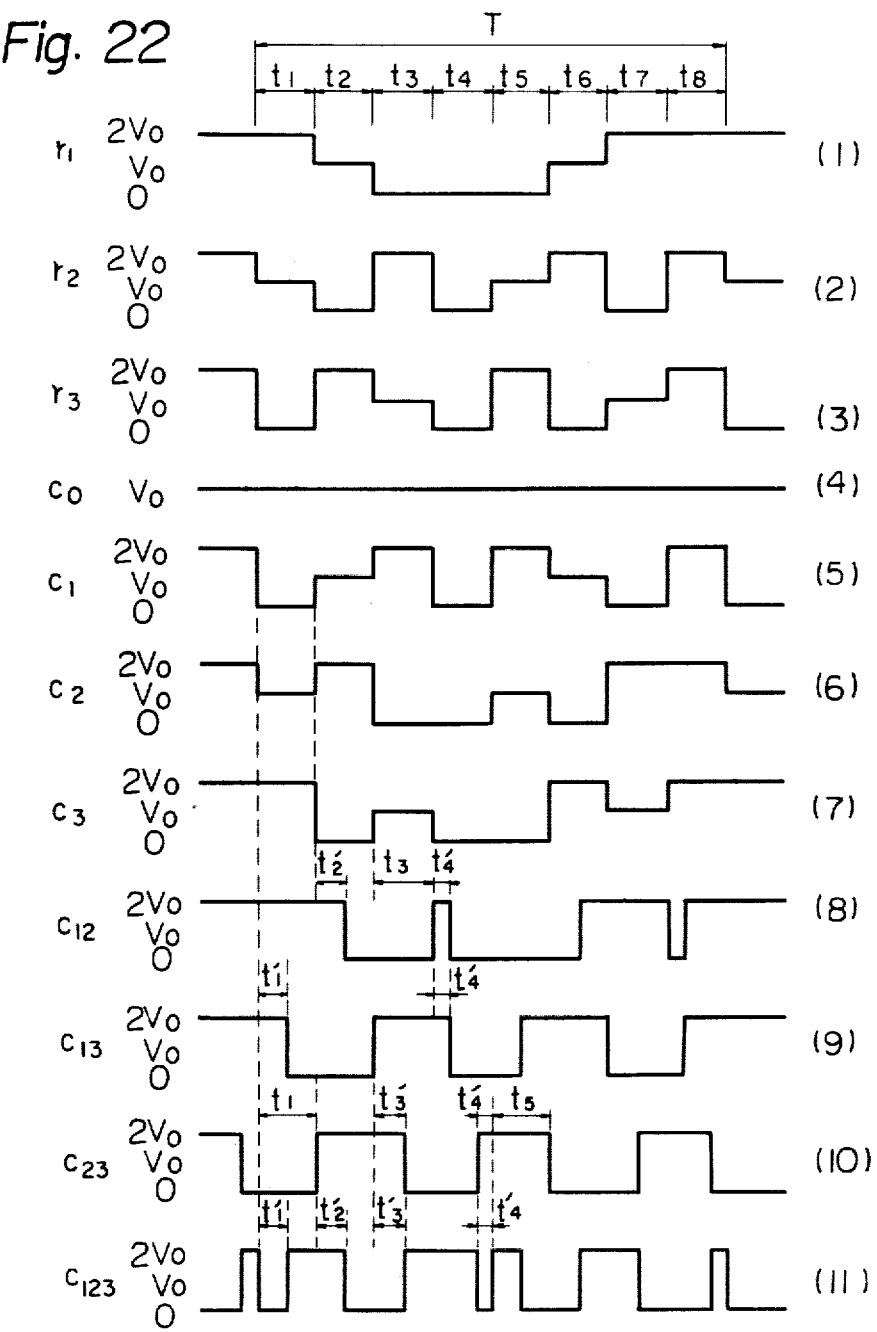
FIG. 22 is a timing chart for another preferred example of digit and segment drive signals according to the present invention.

FIG. 22 shows the waveforms for another example of drive signals in accordance with the present invention. Here n=3 and three potential levels are employed. FIGS. 22(1), (2) and (3) depict the digit drive signal waveforms which are impressed upon respective digit electrodes $r_1'$, $r_2'$ and $r_3'$. FIGS. 22(4) through (11) show segment drive signals $C_0'$ through $C_{123}'$ which correspond to the combined patterns for the display and non-display of digits. t1, t2, ... t8 denote one-eighth divisions of a signal period (frame time) T. t1', t2', t3' and t4' denote subintervals within the respective intervals t1, t2, t3 and t4; t1', t2' and t3' represent a value of T/16, a t4' a value of T/32. For the sake of convenience the voltages over the intervals t5, t6, t7, and t8 are taken to be the reverse in polarity of those over t1, t2, t3 and t4 with respect to the reference line Vo. FIG. 22(4) shows the voltage waveform of a segment signal $C_0'$ indicative of a non-display for all digits, FIGS. 22(5), (6) and (7) depict the voltage waveforms of segment signals $C_1'$, $C_2'$ and $C_3'$ indicative of a state of display for only one digit of respective digits $r_1'$, $r_2'$ and $r_3'$. FIGS. 22(8), (9) and (10) depict the voltage waveforms for segment signals $C_{23}'$, $C_{13}'$ and $C_{12}'$ indicative of a state of non-display for one digit of respective digits $r_1'$, $r_2'$ and $r_3'$, and FIG. 22(11) shows the voltage waveform for a segment signal $C_{123}'$ indicative of a state of display for all digits. According to the prior art, when $n=3$ and $d=1$, $\sqrt{3}$ is the ratio of the root mean square value for the driving voltage of the display state to the non-display state; according to the present invention, the ratio is 2 by which the display contrast is remarkably improved.

It will now be appreciated from FIGS. 13, 17 and 21 that in vector diagram each of angles $C_0r_1G$, $C_0r_2G$, ... and $C_0r_nG$ is less than 45 degrees in which $C_0$ is the vector indicative of a varying potential of the segment drive signal applied to the segment electrode inducing a non-display state at all of the digit electrodes, $r_1, r_2, \ldots$ and $r_n$ are the vectors of varying potentials of the digit drive signals, and G is the potential indicating vector represented by the mean value of the potentials of all the digit drive signal and in which $C_0$ is substantially coincident with G; each of angles $C_1Gr_1$, $C_2Gr_2$, ... and $C_nGr_n$ defines an obtuse angle in which $C_1, C_2, \ldots$ and $C_n$ are the vectors of the segment drive signals applied to the segment electrodes inducing a display state at a corresponding one of the digit electrodes alone; and the line segments $C_1C_0$, $C_2C_0$, ... and $C_nC_0$ tying the vectors $C_1, C_2, \ldots$ and $C_n$ and the vector $C_0$ define between each pair an obtuse angle. When the number of digit electrodes is 2, further, the cosine of the angle $C_0r_1G$ is greater than $\sqrt{\frac{1}{2}}$ and the cosine of each of the angles $C_1r_1G$, $C_2r_2G$ ... is greater than $$A/(1+\sqrt{2})+\tfrac{1}{2}A$$

in which A is the cosine of the angle $C_0r_1G$. When the number of digit electrodes is 3, further more, the cosine of the angle $C_0r_1G$ is greater than $\tfrac{2}{3}$ and the cosine of each of the angles $C_1r_1G$, $C_2r_2G$ and $C_3r_3G$ is greater than $$(\sqrt{3}-1)A/\sqrt{2}+\sqrt{\tfrac{2}{3}}A$$

in which A is the cosine of the angle $C_0r_1G$.

In summary, the operation margin can be increased in a driving method of the present invention by (1) selecting the potential of the segment drive signal $C_0$ inducing the state of non-display at all of the digit electrodes to be approximately equal to the mean value G of the potentials of all the digit drive signals while maintaining the relationship $$C_0r_1 \approx C_0r_2 \approx \ldots$$

and by (2) selecting the potentials $C_1, C_2 \ldots$ of the segment drive signals such that $C_1r_1G$ approximately defines a straight line on the vector diagram and the line segments defined by $C_1r_2$, $C_1r_3$ ... are substantially equal to the line segment defined by $C_0r_1$ in the vector diagram.

In the prior art matrix driving method, since the potential of the segment drive signal is selected to a value such that the vectors of the segment drive signals are located on the apices of a cube in an n-dimension space, each of angles $C_1C_0C_2$, $C_1C_0C_3$, $C_2C_0C_3$ ... defines a right angle. Therefore, the conditions (1) and (2) mentioned above can not be satisfied by the prior art matrix driving method. In the matrix driving method of the present invention, on the contrary, the potentials $C_0, C_1, C_2 \ldots$ of the segment drive signals are selected to have values such that each of the angles $C_1C_0C_2$, $C_1C_0C_3$, $C_2C_0C_3$ ... is an obtuse angle whereby the above noted conditions (1) and (2) can be satisfied.

Next, the potential of each of the segment drive signals $C_{12}$ inducing the state of display at two of the digit electrodes ... is selected to have a value which satisfies the following relation:

$$C_{12}r_1 = C_{12}r_2 = C_{13}r_1 = C_{13}r_3 \ldots = C_1r_1$$

$$= C_{12}r_3 \ldots = C_0r_1$$

In a modified example, i.e., in a case in which it is difficult to provide a larger potential difference between the segment drive signal $C_{12}'$ inducing the state of display at all the digit electrodes and each of the digit drive signals $r_1', r_2' \ldots$, the potential of the segment drive signal $C_0'$ and the potentials of the digit drive signals $r_1', r_2' \ldots$ are selected to have the same level during a predetermined time interval during which the potential difference exists between the segment drive signal $C_{12}'$ and each of the digit drive signals $r_1', r_2' \ldots$ in such a manner as shown in FIG. 16.

The above noted conditions (1) and (2) can be more clearly explained by the geometrical analysis. Let the cosine of angle $C_0r_1G$ be A and the cosine of angle $C_1r_1G$ be B, the operation margin $\alpha$ is expressed as:

$$B = \frac{a^2 + y^2 - x^2}{2ay}$$

in which x and y denote the factors of A and are written as:

when $n=2$, $x=2A$ and $y=1$
when $n=3$, $x=3A/2$ and $y=\sqrt{1-3A^2/4}$ With $n=2$, let $A>\sqrt{1/2}$ and $$B > \left( \frac{A}{1+\sqrt{2}} + \frac{1}{2A} \right).$$

In this case, the maximum operation margin $\alpha$ obtained in the prior art driving method is expressed by:

$$\alpha = \sqrt{2}+1$$

With $n=3$, let $A>\sqrt{\tfrac{2}{3}}$ and $$B > \frac{\sqrt{3}-1}{\sqrt{2}} A + \frac{\sqrt{2}}{3A}.$$

In this case, the maximum operation margin $\alpha$ obtained in the prior art driving method is expressed by:

$$a = \frac{\sqrt{3}+1}{\sqrt{2}}$$

It is to be noted that the operational margin can be increased to the maximum value by letting A=B=1. This example is shown in FIG. 11, 14, 19 and 22 in which the operation magin is 3 when n=2, and 2 when n=3.

Figure 23:
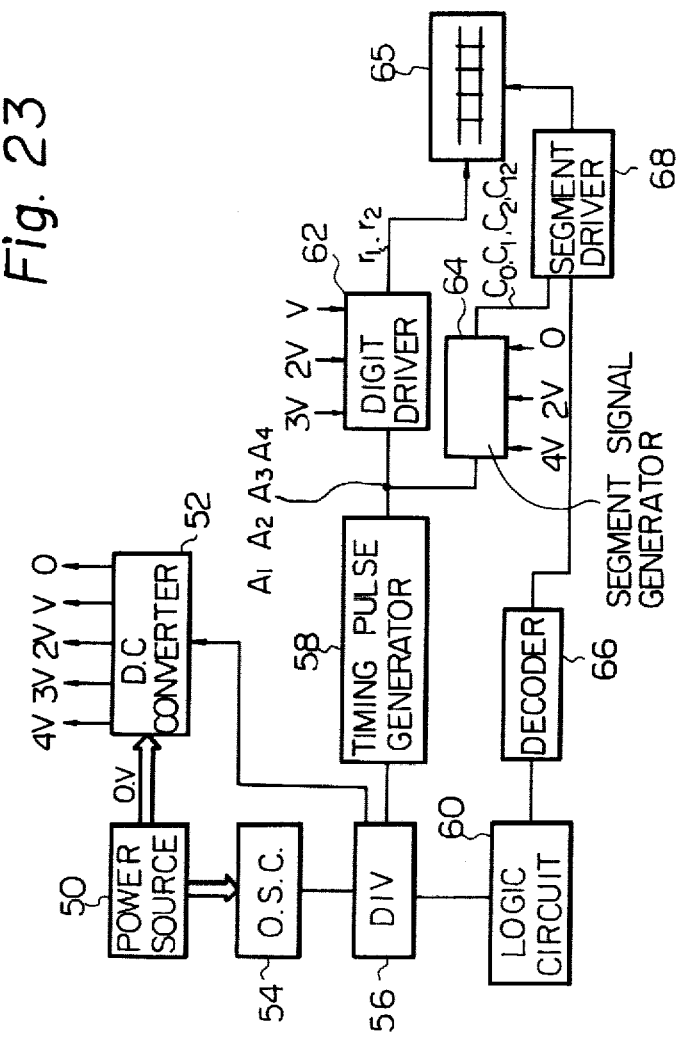
FIG. 23 is a block diagram of an example of a driver circuit to carry out a method of the present invention.

FIG. 23 illustrates a block diagram of electric circuitry of a drive system for an electro-optical display device including digit and segment electrodes arranged in a matrix configuration. The drive system shown in FIG. 23 is arranged to produce drive signals having the waveforms as shown in FIG. 11 by way of example. The drive system has a power source 50 such as a battery to provide outputs at 0 volts and V volts. A D.C. converter 52 is connected to the power source 50 to provide output voltages at 0, V, 2 V, 3 V and 4 V. The power source 50 also connected to an oscillator circuit 54 operating at a relatively high frequency. This relatively high frequency is supplied to a frequency converter 56 in the form of a divider which divides down the frequency from the oscillator circuit 54 to provide low frequency signals. These low frequency signals are applied to the D.C. converter 52, a timing pulse generator 58 and a logic circuit 60. The timing pulse generator 58 generates various timing signals at predetermined frequencies in response to the low frequency signals from the frequency converter 56. These timing signals are applied to a digit driver 62 and a segment signal generator 64. The digit driver 62 generates digit drive signals $r_1'$ and $r_2'$ having waveforms shown in FIG. 11 in response to the timing signals delivered from the timing pulse generator 58 and the voltage signals V, 2 V and 3 V delivered from the D.C. converter 52. The digit drive signals are applied to digit electrodes of an electro-optical display device 65 which may be a liquid crystal. The segment signal generator 64 generates segment signals $C_0'$, $C_1'$, $C_2'$ and $C_{12}'$ having the waveforms shown in FIG. 11 in response to the timing signals from the timing signal generator 64 and output voltages 0, 2 V and 4 V delivered from the D.C. converter 52.

The logic circuit 60 generates outputs in response to the low frequency signal delivered from the frequency converter 56. These outputs are applied to a decoder 66, which generates decoded outputs. The decoded outputs are applied to a segment driver 68, to which the segment drive signals are also applied. The segment driver 68 delivers selected one of the segment drive signals to selected one of segment electrodes arranged in a matrix configuration with respect to the digit electrodes. In this manner, the display device 65 effects a display or non-display at desired segments or display elements in a particular pattern in dependence on the digit drive signal and the segment drive signal applied to the display device.

Figure 24:
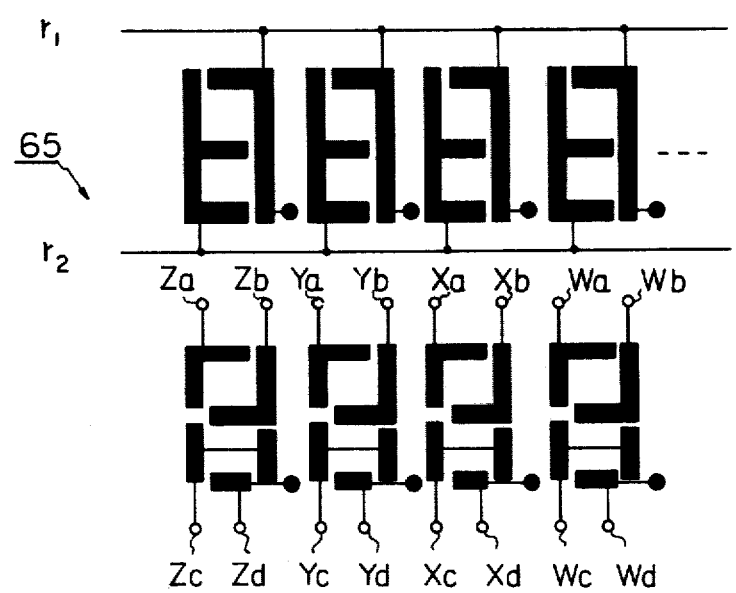
FIG. 24 is a view showing an example of an arrangement of a display device shown in FIG. 23.

FIG. 24 shows a detailed circuit connection for the digit electrodes and the segment electrodes of a portion of the display device 65 shown in FIG. 23. s shown in FIG. 24, each digit includes four segment electrodes such as Wa, Wb, Wc and Wd and each segment electrode has first and second portions disposed opposite the first and second digit electrodes $r_1'$ and $r_2'$, respectively.

Figure 25:
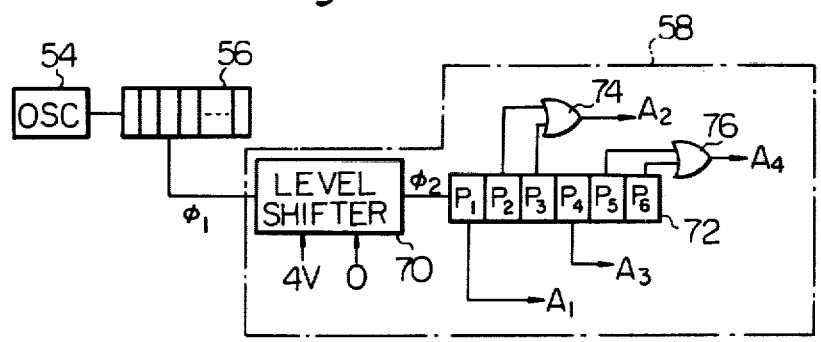
FIG. 25 is a detail circuitry for a timing pulse generator shown in FIG. 23.
Figure 26:
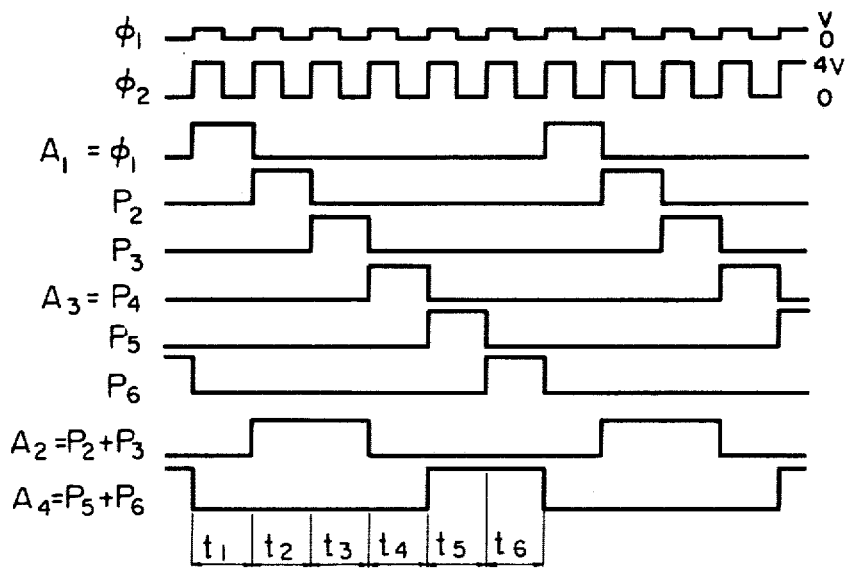
FIG. 26 is a timing chart for timing signals generated by the circuit shown in FIG. 25.

FIG. 25 shows an example of the timing signal generator 58 shown in FIG. 23. As shown, the timing signal generator 58 comprises a level shifter 70 which generates a clock signal $\phi_2$ having the potential 4 V as shown in FIG. 26 in response to a clock signal $\phi_1$ from the frequency converter and output voltages 0 and 4 V delivered from the D.C. converter 52 (see FIG. 23). The clock signal $\phi_2$ is applied to a count-by-6 ring counter 72 composed of a plurality of flip-flop $P_1$ through $P_6$. The flip-flop $P_1$ and $P_4$ generate timing signals $A_1$ and $A_3$ as shown in FIG. 25. The outputs of the flip-flops $P_2$ and $P_3$ are connected to an OR gate 74, which generates a timing signal $A_2$. Likewise, the outputs of the flip-flops $P_5$ and $P_6$ are connected to an OR gate 76, which generates a timing signal $A_4$. The waveforms of the timing signals $A_2$ and $A_4$ are shown in FIG. 26.

Figure 27:
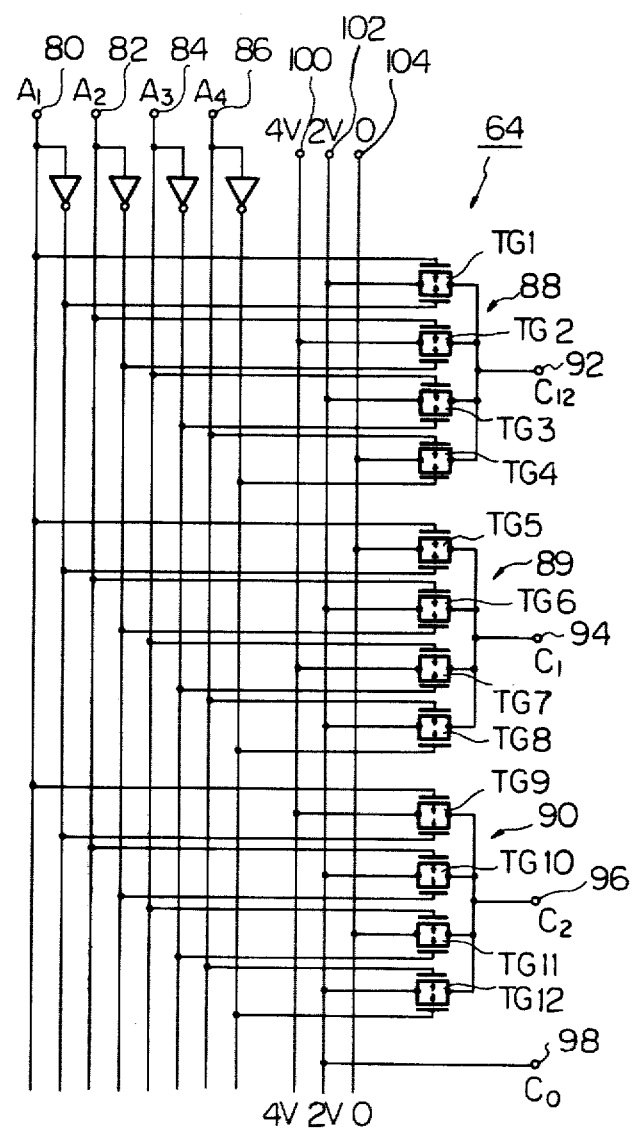
FIG. 27 is a detail circuitry for a segment signal generator shown in FIG. 23.

FIG. 27 shows an example of the segment signal generator 64 shown in FIG. 23. The segment signal generator 64 comprises a plurality of input terminals 80, 82, 84 and 86, and a plurality of switching circuits 88, 89 and 90 having their outputs connected to terminals 92, 94 and 96 labelled $C_{12}'$, $C_1'$ and $C_2$, respectively. The switching circuit 88 is composed of transmission gates TG1 through TG4 having control gates connected to the input terminals 80, 82, 84 and 86 to receive the timing signals $A_1$, $A_2$, $A_3$ and $A_4$, respectively. The transmission gates TG1 through TG4 also have inputs connected to terminals 102, 100, 102 and 104 to receive the output voltages 2 V, 4 V, 2 V and 0 delivered from the D.C. converter 52, respectively. Outputs of the transmission gates TG1 through TG4 are coupled together and connected to the outputs terminals 92. With this arrangement, when the timing signal $A_1$ goes to a high logic level during the time interval $t_1$ as shown in FIG. 26, the transmission gate TG1 is turned on, and the output terminal 92 is connected to the terminal 102. Therefore, the segment drive signal $C_{12}'$ has the potential of 2 V during the time interval $t_1$. During the time intervals $t_2$ and $t_3$, the timing signal $A_2$ is at a high logic level and, during this time period, the transmission gates TG2 is turned on. In this instance, the output terminal 92 is connected to the terminal 4V, and the segment signal $C_{12}'$ has the potential of 4 V during the time intervals $t_2$ and $t_3$ as shown in FIG. 11. During the time interval $t_4$, the timing signal $A_3$ goes to a high logic level, rendering the transmission gate TG3 to turn on. In this instance, the output terminal 92 is coupled to the terminal 102 and, therefore, the segment drive signal $C_{12}'$ has the potential of 2 V during the time interval $t_4$ as shown in FIG. 11. During the time intervals $t_5$ and $t_6$, the timing signal $A_4$ is at a high logic level and the output terminal 92 is coupled to the terminal 104. In this case, the segment drive signal $C_{12}'$ has the potential of 0 during the time intervals $t_5$ and $t_6$ as shown in FIG. 11.

Transmission gates TG5 through TG8 of the switching circuit 89 are similar to those of the switching circuit 88 except that the inputs of the transmission gates TG5 through TG8 are connected to the terminals 104, 102, 100 and 102, respectively. Similarly, inputs of transmission of gates TG9 through TG12 are connected to the terminal 100, 102, 104 and 102, respectively. Output terminal 98 labelled $C_0'$ is directly connected to the terminal 102 and, therefore, the potential of the segment drive signal $C_0'$ is 2 V at all times as shown in FIG. 11. The switching circuits 89 and 90 will operate in the same manner as the switching circuit 88 and, therefore, the detailed description of the same is herein omitted for the sake of simplicity of description.

Figure 28:
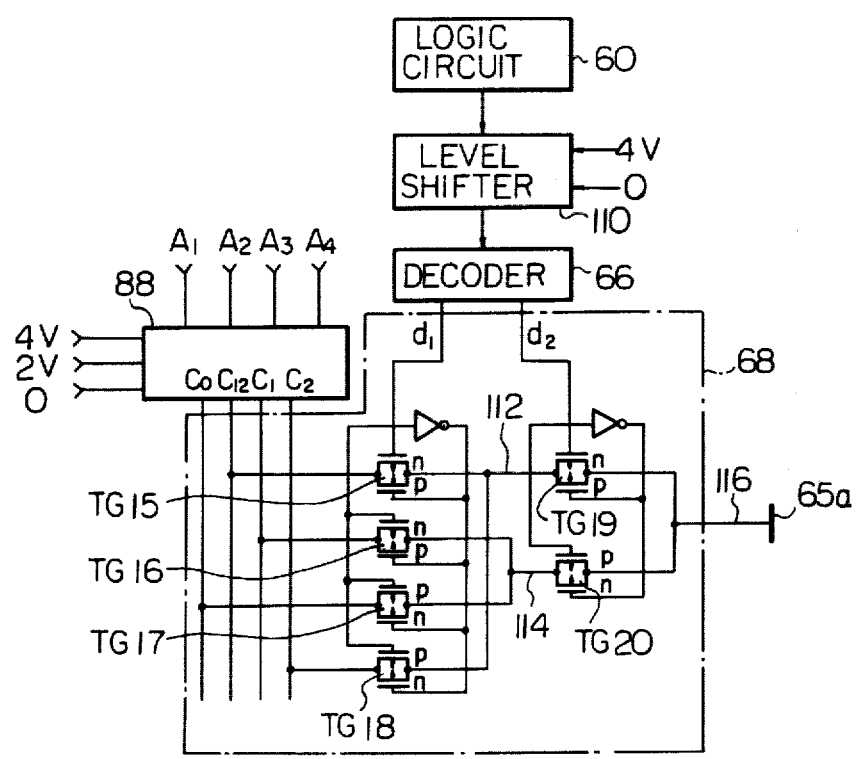
FIG. 28 is a detail circuitry for a segment driver shown in FIG. 23.

FIG. 28 shows an example of the segment driver 68 in which the decoder 66 is shown as connected to the logic circuit 60 through a level shifter 110 adapted to convert output signals from the logic circuit 60 to signal having voltage potentials 0 and 4 V. The decoder 66 generates two-bit signals $d_1$ and $d_2$, which are applied to control gates of first group of transmission gates TG15 through TG18 and a second group of transmission gates TG19 and TG20. Inputs of the transmission gates TG15 through TG18 are connected to the segment signal generator 88 to receive the segment signals $C_{12}'$, $C_1'$, $C_0'$ and $C_2$, respectively. Outputs of the transmission gates TG15 and TG18 are connected together and coupled through lead 112 to input of the transmission gate TG19. Likewise, outputs of the transmission gates TG16 and TG17 are connected through lead 114 to an input of the transmission gate TG20. The outputs of the transmission gates TG19 and TG20 are coupled through lead 116 to a segment electrode 65a of the display device 65.

When the signal $d_1$ is at a high logic level, the transmission gates TG15 and TG16 are turned on, while the transmission gates TG17 and TG18 are turned off. If, on the contrary, the signal $d_1$ is at a low logic level, the transmission gates TG15 and TG16 are turned off, while the transmission gates TG17 and TG18 are turned on. On the other hand, if the signal $d_2$ is at a high logic level, the transmission gate TG19 is turned on, while the transmission gate TG20 is turned off. If, on the contrary, the signal $d_2$ is at a low logic level, the transmission gate TG19 is turned off, while the transmission gate TG20 is turned on.

When, now, both of the signals $d_1$ and $d_2$ go to a high logic level, the segment signal $C_{12}'$ appears on lead 112 and the segment signal $C_1$ appears on lead 114. Since, in this instance, the transmission gate TG19 is turned on and the transmission gate TG20 is turned off, the segment signal $C_{12}'$ is applied through lead 116 to the segment electrode 65a. When the signal $d_1$ goes to a low logic level while the signal $d_2$ is at a high logic level, the segment signal $C_2'$ appears on lead 112 while the segment signal $C_0'$ appears on lead 114. Since, in this case, the transmission gate TG19 is turned on and the transmission gate 20 is turned off, the segment signal $C_2'$ is applied through lead 116 to the segment electrode 65a. In this manner, selected one of the segment drive signals are applied to the segment electrode 65a in dependence on the decoded outputs $d_1$ and $d_2$ delivered from the decoder 66.

Figure 29:
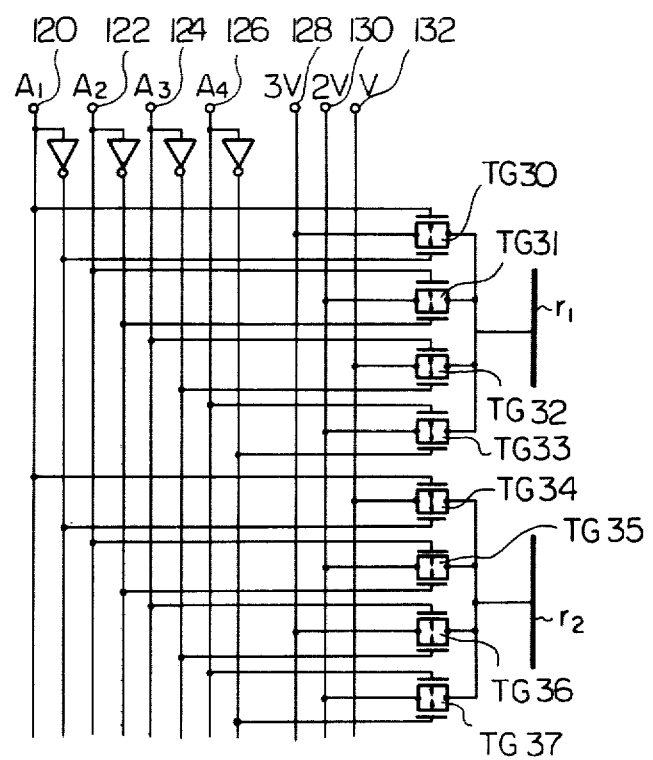
FIG. 29 is a detail circuitry for a digit driver shown in FIG. 23.

FIG. 29 shows an example of the digit driver 62 shown in FIG. 23. The digit driver 62 comprises control terminals 120, 122, 124 and 126 labelled $A_1$, $A_2$, $A_3$ and $A_4$, and input terminals 128, 130 and 132 labelled 3 V, 2 V and V, respectively. The digit driver 62 also comprises a first group of transmission gates TG30 through TG33 and a second group of transmission gates TG34 through TG37. The transmission gates TG30 through TG33 have control gates connected to the control terminals 120 through 126, respectively, and inputs connected to terminals 128, 130, 132 and 130, respectively. Outputs of the transmission gates TG30 through TG33 are connected to the $r_1'$ digit electrode. Similarly, the transmission gates TG34 through TG37 have control gates connected to the terminals 120, 122, 124 and 126, respectively, and inputs connected to the terminal 132, 130, 128 and 130, respectively. Outputs of the transmission gates TG34 through TG37 are connected to the $r_2$ digit electrode.

With this arrangement, when the timing signal $A_1$ goes to a high logic level, the transmission gates TG30 and TG34 are turned on and the remaining transmission gates are turnd off. Under these circumstances, the potential at the $r_1'$ digit electrode is 3 V and the potential at the $r_2'$ digit electrode is V. When the timing signal $A_2$ goes to a high logic level, the transmission gates TG31 and TG35 are turned on and the remaining transmission gates are turned off. Under these circumstances, the potential at the $r_1'$ digit electrode is 2 V and the potential at the $r_2'$ digit electrode is 2 V. When the timing signal $A_3$ goes to a high logic level, the transmission gates TG32 and TG36 are turned on and the potential at the $r_1$ digit electrode V while the potential at the $r_2'$ digit electrode is 3 V. When the timing signal $A_4$ goes to a high logic level, the transmission gates TG33 and TG37 are turned on and the potential at the $r_1'$ digit electrode is 2 V while the potential at the $r_2$ digit electrode is 2 V. In this manner, the potentials of the digit drive signals vary in dependence on the logic levels of the timing signals $A_1$ through $A_4$.

Figure 30:
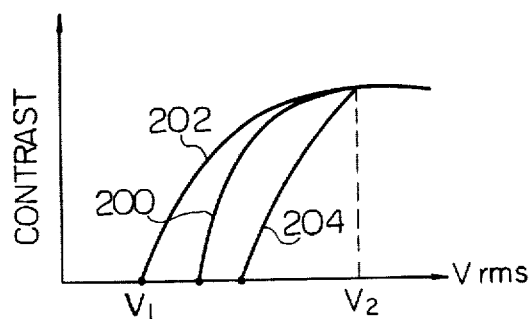
FIG. 30 is a graph illustrating voltage characteristics for a liquid crystal.

The brightness of a liquid crystal is a factor related to temperature. More specifically, the threshold voltage increases with a drop in temperture and decreases when the temperature rises. FIG. 30 shows the voltage characteristics for liquid crystal contrast. Reference numerals 200, 202 and 204 show temperatures of 25° C., 40° C. and 0° C. At 25° C., for example, an operation margin of $\sqrt{5}$ may suffice but over a wide temperature range such as 0° C. to 40° C. sufficient contrast is in general difficult to obtain. If the operation margin is widened, however, driving can be accomplished more readily over a wide temperature range and the liquid crystal itself performs a contrast temperature compensation. If in the V 1, V 2 range V 2/V 1 is chosen to be less than $\sqrt{7}$, contrast degradation due to temperature will not occur.

Figure 31:
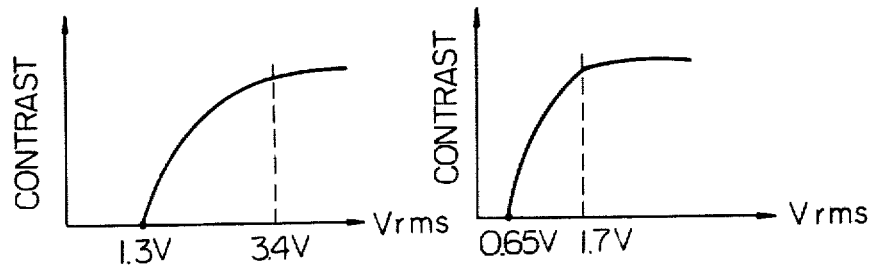
FIG. 31 shows graphs illustrating voltage-contrast curves for a liquid crystal when driving is accomplished by a driving method according to the present invention.

FIG. 31 shows voltage-contrast curves for a liquid crystal when driving is accomplished by the waveforms shown in FIG. 16. FIG. 31(1) shows a case in which a battery voltage of 1.6 Volts and a two-stage D.C. converter are employed. Accordingly, 2v 0=3.2 V, and 3V 0=4.8 V. In this case the liquid crystal threshold voltage $V_{TH}$ is 1.3 Vrms, and the saturation voltage Vs is 3.4 Vrms. FIG. 31(2) shows a case where the battery voltage 2V 0 is 1.6 V. Thus, V 0=0.8 V, and 3 V 0=2.4 V. In such a case $V_{TH}$=0.65Vrms, and Vs=1.7Vrms.

Figure 32:
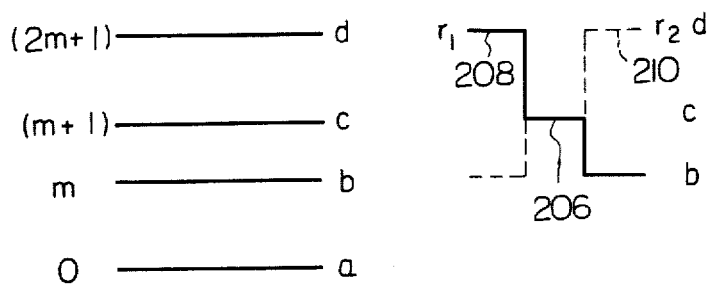
FIG. 32 shows diagrams illustrating the relationship between the potential levels and the drive signals used in a driving method of the present invention.

FIG. 32 shows a general configuration for matrix driving according to the present method when n=2 and four potential levels are employed. FIG. 32(1) depicts states of potential levels. Here, a represents a 0 level, b an m level, c an m+1 level, and d a 2m+1 level. In other words, the potential difference between bc is 1, and the potential difference between ab and between cd is m. The potential levels between ab and between cd have been taken to be equal so that the DC component will not appear.

FIG. 32(2) depicts digit driving signals. With discussion limited to one-half period, the solid line represents a signal $r_1'$ and the broken line a signal $r_2'$. Reference numeral 206 denotes a portion where the potential levels of $r_1'$ and $r_2'$ coincide. Time intervals 208 and 210 are equal to each other. Since only a half-period will be considered, potentials b, c and d will be discussed. Here it suffices to impress the c potential upon the segment electrodes in order to bring both segments to a non-display state. That is, during the interval in which there is coincidence between the potential levels of the digit driving signals, it will suffice to apply a segment signal having the same potential level. In this case the rms voltage is $m^2+1/T$. T is a given constant which is determined by a value of one-half of the frame time. For a case in which one segment at a matrix intersection is to be brought to a display state while the other segment at the intersection is to be brought to a non-display state, the rms voltage for the non-display state will be $\sqrt{\{m^2+(m+1)^2 ta+tb+m^2 td\}/T}$ if there is applied a segment signal which includes a, d levels for intervals 208 and 210 and a, b, c and d levels for the interval 206; here these intervals shall be denoted by ta, tb, tc and td. These intervals can be selected so that $(m+1)^2 ta+tb+m^2 td=1$. The rms voltage for the display state is given by $\sqrt{\{(2m+1)hu\ 2+1+(m+1)^2\}/T}$.

When both segments are to be brought to a state of display, the rms voltage for the non-display state will be $\sqrt{\{(2m+1)^2+(m+1)^2 ta+tb+m^2 td+m^2\}/T}$ if there is applied a segment signal which includes the a level for intervals other than that indicated at 206, and the a, b, c, and d levels for the interval 206, these intervals once again being denoted by ta, tb, tc and td. These intervals can be selected so that $(m+1)^2 ta+tb+m^2 td+m^2=(m+1)^2+1$. The rms voltage for the display state is given by $\sqrt{\{(2m+1)^2+(m+1)^2+1\}/T}$.

The waveforms shown in FIG. 16 indicates a case where n=2. In this case, the operation margin $\alpha$ is written as:

$$\alpha = \sqrt{(5m^2+6m+3)/(m^2+1)} = \sqrt{7}$$

If m is selected to be within a range between 0.51 and 7, the operation margin $\alpha$ may have a value greater than the maximum operation margin $(\sqrt{2}+1)$ obtained in the prior art drive signals.

While the present invention has been shown and described with reference to particular examples, it should be noted that various other changes or modifications may be made without departing from the scope of the present invention.

What is claimed is:

1. A method of cyclically driving a liquid crystal display device having a matrix array of a first and second digit electrodes and a plurality of segment electrodes associated with said digit electrodes, respectively, to define a plurality of display elements, comprising the steps of:

applying first and second digit drive signals to said first and second digit electrodes, respectively; and applying at least one of first, second and third segment drive signals to each of said plurality of segment electrodes, with the first segment drive signal inducing a state of non-display at said display elements on all of said digit electrodes during a half cycle period, the second segment drive signal inducing a state of display at said display elements on all of said digit electrodes during said half cycle period, and the third segment drive signal inducing a state of display at said display elements on one of said digit electrodes during said half cycle period;

said first and second digit drive signals having first and second voltage potentials, respectively, during a first time interval of said half cycle period and having a third voltage potential serving as a reference potential during a second time interval of said half cycle period, said reference potential taking a value intermediate between said first and second voltage potentials, with a voltage difference between said first voltage potential of said first digit drive signal and said reference voltage potential being equal to that between said second voltage potential of said second digit drive signal during said first time interval and said first voltage potential of said digit drive signal being opposite in polarity to said second voltage potential of said second digit drive signal during said first time interval of said half cycle period;

wherein said first segment drive signal has a potential level equal to said reference potential during said first and second time intervals, said second segment drive signal has the same potential as said reference potential during said first time interval and a fourth voltage potential largerin amplitude level than said first and second voltage potentials during said second time interval, and said third segment drive signal has at least one of said fourth voltage potential and a fifth voltage potential lower in amplitude level than said first and second voltage potentials during said first time interval and a voltage potential equal to said reference voltage potential during said second time interval.

2. A method of cyclically driving a liquid crystal display device having a matrix array of first and second digit electrodes and a plurality of segment electrodes associated with said first and second digit electrodes, respectively, to define a plurality of display elements, comprising the steps of:

applying first and second digit drive signals to said first and second digit electrodes, respectively; and applying at least one of first, second and third segment drive signals to each of said plurality of segment electrodes, with the first segment drive signal inducing a state of non-display at said display elements associated with said first and second digit electrodes during a half cycle period, the second segment drive signal inducing a state of display at all of said display elements on both of said first and second electrodes during said half cycle period, and the third segment drive signal inducing a state of display at said display elements on one of said first and second digit electrodes during said half cycle period;

said first and second digit drive signals having first and second voltage potentials, respectively, during a first time interval of said half cycle period and having a reference potential during a second time interval of said half cycle period, said reference potential taking a value intermediate between said first and second voltage potentials, with a voltage difference between the first voltage potential of said first digit drive signal and said reference potential being equal to that between the second voltage potential of said second digit drive signal and said reference potential during said first time interval of said half cycle period and said first voltage potential of said first digit drive signal and said second voltage potential of said second digit drive signal being opposite in polarity to one another with respect to said reference potential during said first time interval of said half cycle period;

wherein said first segment drive signal has a voltage potential equal to said reference potential during the first and second time intervals of said half cycle period, said second segment drive signal has a third voltage potential lower in amplitude level than said first and second voltage potentials during a prescribed time period of said first time interval and a fourth voltage potential larger in amplitude level than said first and second voltage potentials during another prescribed time period of said first time interval and during said second time interval, and the third segment drive signal has at least one of said third and fourth voltage potentials during the first interval and a voltage potential equal to said reference potential during said second time interval.

3. A method of cyclically driving a liquid crystal display device having a matrix array of first and second digit electrodes and a plurality of segment electrodes associated with said first and second digit electrodes, respectively, to define a plurality of display elements, comprising the steps of:

applying first and second digit drive signals to said first and second digit electrodes, respectively; and applying at least one of first, second and third segment drive signals to each of said plurality of segment electrodes, with the first segment drive signal inducing a state of non-display at said display elements associated with said first and second digit electrodes during a half cycle period, the second segment drive signal inducing a state of display at all of said display elements on both of said first and second digit electrodes during said half cycle period, and the third segment drive signal inducing a state of display at said display elements on one of said first and second digit electrodes during said half cycle period;

said first and second digit drive signals having first and second voltage potentials, respectively, during a first time interval of said half cycle period and having a reference potential during a second time interval of said half cycle period, said reference potential taking a value intermediate between said first and second voltage potentials, said first and second digit drive signals having said second and first voltage potentials during a third time interval of said half cycle period, respectively, with a voltage difference between the first voltage potential of said first digit drive signal and said reference potential being equal to that between the second voltage potential of said second digit drive signal and said reference potential during said first time interval of said half cycle period and said first voltage potential of said first digit drive signal and said second voltage potential of said second digit drive signal being opposite in polarity to one another with respect to said reference potential during said first time interval of said half cycle period;

wherein said first segment drive signal has a voltage potential equal to said reference potential during said first, second and third intervals of said half cycle period, said second segment drive signal has a third voltage potential lower in amplitude level than said first and second voltage potentials during said first, second and third time intervals, and said third segment drive signal has at least one of said first and third voltage potentials during said first, second and third time intervals.

4. A method of cyclically driving a liquid crystal display device having a matrix array of first, second and third digit electrodes and a plurality of segment electrodes associated with said first and second digit electrodes, respectively, to define a plurality of display elements, comprising the steps of:

applying first, second and third digit drive signals to said first, second and third digit electrodes, respectively; and applying at least one of first, second and third segment drive signals to each of said plurality of segment electrodes, with the first segment drive signal inducing a state of non-display at said display elements on said first, second and third digit electrodes during a half cycle period, the second segment drive signal inducing a state of display at said display elements on one of said first, second and third digit electrodes during said half cycle period, and the third segment drive signal inducing a state of display at said display elements on all of said first, second and third digit electrodes during said half cycle period;

said first, second and third digit drive signals having first, second and third voltage potentials, respectively, during a first time interval of said half cycle period, said first and second digit drive signals having said third and first voltage potentials during a second time interval during which said third digit drive signal has said second voltage potential intermediate in amplitude between said first and third voltage potentials and serving as a reference potential, said second and third digit drive signals having said third and first voltage potentials, respectively, during a third time interval during which said first digit drive signal has said reference potential, said first, second and third digit drive signals having said reference potential during the remaining time intervals of said half cycle period;

wherein said first segment drive signal has a voltage potential equal to said reference potential during said half cycle period, said second segment drive signal has one of said first, second and third voltage potentials during said first time interval and another one of said first, second and third voltage potentials during said second time interval, another one of said first, second and third voltage potentials during said third time intervals, and said reference potential during said remaining time intervals of said half cycle period, the third segment drive signal has said first voltage potential during said half cycle period.

* * * * *